United States Patent
Litty et al.

(10) Patent No.: US 11,979,383 B1
(45) Date of Patent: May 7, 2024

(54) TRANSPARENT WEB BROWSING RECORDER

(71) Applicant: Menlo Security, Inc., Mountain View, CA (US)

(72) Inventors: Lionel Litty, San Francisco, CA (US); Todd Ignasiak, Mountain View, CA (US); Rodrigo Graf, San Jose, CA (US)

(73) Assignee: Menlo Security, Inc., Mountain View, CA (US)

( * ) Notice: Subject to any disclaimer, the term of this patent is extended or adjusted under 35 U.S.C. 154(b) by 0 days.

(21) Appl. No.: 17/306,800

(22) Filed: May 3, 2021

Related U.S. Application Data

(60) Provisional application No. 63/019,592, filed on May 4, 2020.

(51) Int. Cl.
| | |
|---|---|
| *H04L 9/40* | (2022.01) |
| *G06F 21/57* | (2013.01) |
| *G06F 21/60* | (2013.01) |
| *G06F 21/62* | (2013.01) |
| *H04L 9/06* | (2006.01) |

(52) U.S. Cl.
CPC .......... *H04L 63/0281* (2013.01); *G06F 21/57* (2013.01); *G06F 21/604* (2013.01); *G06F 21/6245* (2013.01); *H04L 9/0643* (2013.01)

(58) Field of Classification Search
CPC ... H04L 63/0281; H04L 9/0643; G06F 21/57; G06F 21/604; G06F 21/6245
See application file for complete search history.

(56) References Cited

U.S. PATENT DOCUMENTS

| | | | | |
|---|---|---|---|---|
| 8,429,745 | B1* | 4/2013 | Casaburi | G06F 21/554 726/1 |
| 9,391,832 | B1* | 7/2016 | Song | G06F 12/1408 |
| 10,452,868 | B1* | 10/2019 | Sundberg | G06F 21/53 |
| 10,735,793 | B1* | 8/2020 | Bhattacharya | H04N 21/4825 |
| 10,868,881 | B1* | 12/2020 | Chang | H04L 67/5681 |
| 2003/0189499 | A1* | 10/2003 | Stricklin | G08G 1/0175 340/933 |
| 2014/0136693 | A1* | 5/2014 | Greifeneder | H04L 41/5067 709/224 |
| 2014/0143264 | A1* | 5/2014 | Runcie | G06F 11/3438 709/224 |
| 2015/0007015 | A1* | 1/2015 | Nekkalapudi | G06F 16/954 715/234 |
| 2015/0135264 | A1* | 5/2015 | Amiga | H04L 63/08 726/1 |

(Continued)

OTHER PUBLICATIONS

Author Unknown, RSA NetWitness Platform Solution Brief, 2021, pp. 1-6.

(Continued)

*Primary Examiner* — Harris C Wang
(74) *Attorney, Agent, or Firm* — Van Pelt, Yi & James LLP

(57) ABSTRACT

Transparent web browsing recording is disclosed. A request is received, at a browser isolation system, from a client browser executing on a client device, to connect with a remote resource. A surrogate browser is provided to facilitate communications between the client browser and the remote resource. A set of browsing activities associated with use of the surrogate browser by the client browser is recorded.

37 Claims, 45 Drawing Sheets

(56) References Cited

U.S. PATENT DOCUMENTS

2019/0075130 A1* 3/2019 Petry ................... H04L 63/0209
2019/0354717 A1* 11/2019 Boon ................... H04L 63/0421
2020/0159370 A1* 5/2020 Lees .................... G06F 16/957
2020/0314121 A1* 10/2020 Mittermaier ............ H04L 63/20

OTHER PUBLICATIONS

Andrica et al., WaRR: A Tool for High-Fidelity Web Application Record and Play, 2011 IEEE/IFIP 41st International Conference on Dependable Systems & Networks (DSN), 2011, pp. 403-410.
Aoki et al., Web Operation Recorder and Player, Proceedings Seventh International Conference on Parallel and Distributed Systems, 2000, pp. 501-508.
Jose Miguel Morais Morgado, Minium Recorder Browser Interaction Recording, PhD Dissertation, 2016.

* cited by examiner

FIG. 10

Edit DLP Rule

DLP Rule

RULE DETAILS

| | |
|---|---|
| Rule Name | Block CreditCard Uploads |
| Description | Enter Description |
| User Notification (Displayed on block pages) | You have attempted to submit protected corporate content to an Internet WWW site that is not approved by corporate policy |

Content Types
Criteria
Action
Dictionaries / Groups

Cancel  < Back  Next >  Save

FIG. 11

| Edit DLP Rule | |
|---|---|
| DLP Rule | USER INPUT INSPECTION |
| Content Types | User input will be passed through DLP inspection when network submissions are requested. If DLP inspection generates a policy block, the tab is blocked from network access and the user is notified. |
| Criteria | (•) Inspect Text Inputs |
| Action | FILE UPLOAD INSPECTION |
| Dictionaries / Groups | Files being uploaded will be passed through DLP inspection. If DLP inspection generates a policy block, the upload is blocked and the user is notified. |
| | Maximum File Size [50] [MB ˅] |
| | (•) Inspect All File Types |

[Cancel] [< Back] [Next >] [Save]

Edit DLP Rule

- DLP Rule
- Content Types
- Criteria
- Action
- Dictionaries / Groups

USERS AND GROUPS

○ All Users

List of Users — Enter users(s)

List of Groups — [finance dept ×] [marketing dept ×]
Enter groups(s)

DOMAINS

Domains (optional) — dropbox.com dlptest.com box.com

CATEGORIES

Categories (optional) — Add Categories

Cancel | <Back | Next> | Save

Edit DLP Auditor Profile

AUDITOR DETAILS
Auditor Name    DLPAdmins
Description     DLP Admin Auditors team

AUDITORS AND FILE DETAILS
Email Addresses    bob@example.com ✕    charlie@example.com ✕
                   Enter Email Address(es)

Send File          ◯
File Format        Encrypted ZIP File
Encrypted ZIP Password    [Generate Password]

Cancel  Save

FIG. 14

Edit DLP Rule

| DLP Rule |
|---|
| Content Types |
| Criteria |
| Action |
| Dictionaries / Groups |

ACTION

Action ⊙ Block ˅

Send Audit Email ⬤

Select Auditors [DLPAdmins ×  Add Auditors]

Cancel | <Back | Next> | Save

FIG. 15

| Edit DLP Rule | | | | |
|---|---|---|---|---|
| DLP Rule | | | | |
| Content Types | DLP GROUPS / DICTIONARIES | | | |
| Criteria | Credit ⌄ | All Types ⌄ | All Categories ⌄ | All Regions ⌄ [Clear] |
| Action | 13 items selected | | | 1-10 of 23 ⌄ ⌃ |
| Dictionaries / Groups | Name ▲ | Type | Category | Region |
| | Credit card magnetic track 1 [Global] | Predefined Dictionary | Financial Data, PCI DSS | Global ▢ |
| | Credit card magnetic track 2 [Global] | Predefined Dictionary | Financial Data, PCI DSS | Global ☑ |
| | Credit card number - with phrases [Global] | Predefined Dictionary | Personally Identifiable Information, Financial Data, PCI DSS | Global ☑ |
| | Credit card numbers [Global] | Predefined Dictionary | Personally Identifiable Information, Financial Data, PCI DSS | Global ☑ |
| | Credit or debit card numbers near personally identifi... | Predefined Dictionary | Personally Identifiable Information, Financial Data, PCI DSS | Belgium ☑ |
| | Credit or debit card numbers near personally identifi... | Predefined Dictionary | Personally Identifiable Information, Financial Data, PCI DSS | Finland ☑ |
| | Credit or debit card numbers near personally identifi... | Predefined Dictionary | Personally Identifiable Information, Financial Data, PCI DSS | Hong Kong ☑ |
| | Credit or debit card numbers near personally identifi... | Predefined Dictionary | Personally Identifiable Information, Financial Data, PCI DSS | India ☑ |
| | Credit or debit card numbers near personally identifi... | Predefined Dictionary | Personally Identifiable Information, Financial Data, PCI DSS | Singapore ☑ |

[Cancel] [< Back] [Next >] [Save]

Menlo Security

Password Required

Name: Test Credit Card Account Numbers Encrypted.docx
Destination: dlpest.com

This file must be inspected before uploading but is encrypted. Please input password.

[*********]  Submit

MenloSecurity — todd@menlosecurity.com

SSL Inspection  Web Applications  Exceptions  Threats  Categories  Documents & Files  Content Inspection

- Dashboard
- Logs
- Analytics Beta
- ✓ Web Policy
- ⊠ Email Policy
- Reporting
- ⚙ Settings
- Customization
- Help

Category Rules

[Search]  [○ All Actions ∨]  [Clear]

2602 } ☐ Enable Browser Data Capture

| Category ▲ | Action | |
|---|---|---|
| Advertisements & Pop-Ups | ● Isolate ∨ | ☐ |
| Alcohol & Tobacco | ✓ Allow ∨ | ☐ |
| Anonymizers | ● Isolate ∨ | ☐ |
| Arts | ● Isolate ∨ | ☐ |
| Business | ● Isolate ∨ | ☐ |
| Chat | ⊙ Block ∨ | ☐ |
| Child Abuse Images | ● Isolate ∨ | ☐ |
| Computers & Technology | | |

◉ MenloSecurity | SSL Inspection  Web Applications  Exceptions  Threats  Categories  Documents & Files  Content Inspection    ⦿ todd@menlosecurity.com▾

- ▦ Dashboard
- ▭ Logs
- ᴫ Analytics Beta
- ✓ Web Policy
- ⊠ Email Policy
- ▱ Reporting
- ⚙ Settings
- ● Customization
- ○ Help

Threat Rules

| Search | ○ All Actions ▾ | Clear |

| Threat Type | Action | Browser Capture |
|---|---|---|
| Vulnerable Service | ● Isolate ▾ | 2702⸺ Defer to Category Policy |
| Uncategorized Site | ● Isolate ▾ | ◻ |
| Flash Site | ● Isolate ▾ | Defer to Category Policy |
| Spam | ● Isolate + Read-Only ▾ | ◻ |
| Phishing | ⊙ Block ▾ | |
| Malware | ● Isolate + Read-Only ▾ | ◻ |
| Malvertising | ⊙ Block ▾ | |
| Compromised Host | ● Isolate + Read-Only ▾ | ◻ |
| Command & Control | ⊙ Block ▾ | |
| Botnet | ● Isolate + Read-Only ▾ | ◻ |

FIG. 27

Policy

Web > Browsing Forensics

Browsing Forensics Rules
Gather forensic data, capturing screenshots and user inputs of isolated sites.

Browsing Forensics
● Enable browsing forensics

Default Rule

| NAME | DESCRIPTION | FORENSICS ENABLED | TAKE SCREENSHOTS | CAPTURE SITE CONTENT | CAPTURE USER INPUT | |
|---|---|---|---|---|---|---|
| All Threats and Categories ⓘ | Default Rule | ✓ | ✓ | | | Edit Default Rule > |

Custom Rules

††† All Actions ▼    Q Search    + Add Rule

| # | NAME | DESCRIPTION | FORENSICS ENABLED | TAKE SCREENSHOTS | CAPTURE SITE CONTENT | CAPTURE USER INPUT | THREATS / CATEGORIES | |
|---|---|---|---|---|---|---|---|---|
| 1 | Download and Streaming | Capture Screenshots and Site Data | ✓ | ✓ | ✓ | | 3 Categories / Threats | |
| 2 | Phishing | Capture Screenshots and Site Data | ✓ | ✓ | ✓ | ✓ | Phishing | |
| 3 | Uncategorized | Capture Screenshots and Content of Uncategorized Sites | ✓ | ✓ | ✓ | | Uncategorized | 🗑 ✎ |
| 4 | Financial Info | Do Not Record any Browsing | | | | | 3 Categories | |

Rows per page: 10 ▼  1 of 1  < >

Policy

← Edit Browsing Forensics Rule

Rule Details

Policy Name
Uncategorized

Description (optional)
Capture Screenshots and Content of Uncategorized Sites

Threats and Categories
Select one or more threats or categories.

Filter By

[ Show All ] Threats | Categories

Available (57)
Filter

- Advertisements & Pop-Ups
- Alcohol & Tobacco
- Anonymizers
- Arts
- Business
- Chat
- Child Abuse Images
- Computers & Technology
- Criminal Activity Selected (1)
Filter

- Uncategorized Site

FIG. 28C

Parameters
Select parameters such as capturing screenshots and user inputs of isolated sites.

● Enable Browsing Forensics

Capture Starts
Capture Starts
[ Automatically ] [ After User Input ]

Screenshots
● Take Screenshots
Screenshots Frequency (Seconds)
5 |

Limit Number of Screenshots (optional)
_____

Site Content and User Input
● Capture Site Content   ☑ Scripts   ☐ HTML   ☐ CSS   ☐ Images
● Capture User Input     ☑ Input Fields (except passwords)   ☐ Passwords

Limit Image Size
● Reduce Image Size (screenshots and resources)
Maximum horizontal size
Low (800px) ▼

Storage
Select Menlo storage or provide a custom configuration.

Storage Configuration
[ Same as Default ] [ Menlo Storage | Custom ]   ⊞ Storage Calculator

Policy

Web > Exceptions

User/Group Exceptions
Use exceptions to bypass default rules for specific users and/or groups.

All Actions ▼   Search

| ☐ | # | EXCEPTION NAME | TYPE | VALUES | ACTION | USERS/GROUPS |
|---|---|---|---|---|---|---|
| ☐ | 1 | Exception 1 | Domain | 268 domains | ⊙ Block | johndoe@company.com |
| ☐ | 2 | Exception 2 | Domain | http://www.sumace.com | ✓ Allow | All |
| ☐ | 3 | Exception 3 | File Download | All | ✓ Allow | johndoe@company.com, marydoe@company.com |
| ☐ | 4 | Exception 4 | Domain | http://www.codehow.com, http://fileuploa2.com | ○ Isolate | All |
| ☐ | 5 | Exception 5 | Domain | 20 domains | ⊙ Block | 27 Users |
| ☐ | 6 | Exception 6 | Category | Image Sharing | ✓ Allow | Designers |
| ☐ | 7 | Exception 7 | Document Isolation | Word Processors | ⊙ Block | Marketing |
| ☐ | 8 | Exception 8 | Geo-IP | Brazil, Russia | ○ Isolate | All |
| ☐ | 9 | Exception 9 | Domain | http://www.donware.com | ○ Isolate/Read-Only | 3 Users, 1 Group |
| ☐ | 10 | Exception 10 | Domain | http://www.dambase.com | ✓ Allow | All |

FIG. 29A

Policy

← Create Browser Forensics Exception

Rule Details And Action

Name
Interns

Description (optional)
Enable forensics for Interns

Browser Forensics Parameters
Select Menlo storage or provide a custom configuration.
● Enable Browsing Forensics

Capture Starts
Capture Starts
[ Automatically | After User Input ]

Screenshots
◯● Take Screenshots
Screenshots Frequency (Seconds)
5|

Limit Number of Screenshots (optional)
_____

Site Content and User Input
◯● Capture Site Content    ☑ Scripts    ☐ HTML    ☐ CSS    ☐ Images
◯● Capture User Input      ☑ Input Fields (except passwords)    ☐ Passwords

Limit Image Size
◯● Reduce Image Size (screenshots and resources)
Maximum horizontal size
Low (800px) ▸

Storage
Select Menlo storage or provide a custom configuration.
Storage Configuration
[ Same as Default | Menlo Storage | Custom ]    ⊞ Storage Calculator

FIG. 29C

Domains
Please enter fully qualified domain names, IPs or IP Ranges.
◯ Any domain
⦿ Domain, IP or IP Ranges
somesite.com

DOMAIN, IP OR IP RANGE anotherwebsite.com subdomain.anotherwebsite.com                    🗑

[ + Add ]  [ ⬆ Import List ]

Rows per page: 10 ▾    1 of 1    <  >

---

Threats and Categories
Select one or more threats or categories.
⦿ All threats/categories

Users/Groups
Apply this exception to all users and groups or limit the exception to a particular user, group or both.
◯ All users/groups
⦿ Users and/or Groups
interns |

[ + Add ]  [ ⬆ Import List ]

USER/GROUP john@corporateemail.com

Rows per page: 10 ▾    1 of 1    <  >

---

Reasons and Tags OPTIONAL

FIG. 29C (Cont.)

Policy

← Create Browser Forensics Exception

Rule Details And Action

Name
Do not capture CEO's data

Description (optional)
Do not enable forensics for the CEO

Browser Forensics Parameters
Select Menlo storage or provide a custom configuration.
● Enable Browsing Forensics

Domains
Please enter fully qualified domain names, IPs or IP Ranges.
● Any domain

Threats and Categories
Select one or more threats or categories.
● All threats/categories

Users/Groups
Apply this exception to all users and groups or limit the exception to a particular user, group or both.
○ All users/groups
● Users and/or Groups
ceo@personalemail.com |    [+ Add]   [→ Import List]

USER/GROUP
ceo@corporateemail.com

Rows per page: 10 ▼    1 of 1  < >

Reasons and Tags OPTIONAL

FIG. 29D

Logs

Logs > Web Logs

Web Logs

Last 15 Days ▼  User: rodrigo@menlosecurity.com ▼  Domain: cnn.com ▼  Browsing Forensics: ON ▼  More +  🔍 Search

| DATE ↓ | USER ID | URL | CATEGORIES | REQUEST TYPE | RISK | ACTION |
|---|---|---|---|---|---|---|
| Nov-11-2020 02:44:21 PM | rodrigo@menlosecurity.com | https://www.cnn.com | News | Page Request | ● Low | ○ Isolate |
| Nov-11-2020 01:13:55 PM | rodrigo@menlosecurity.com | https://www.cnn.com | News | Page Request | ● Low | ○ Isolate |
| Nov-10-2020 11:10:03 PM | rodrigo@menlosecurity.com | https://www.cnn.com | News | Page Request | ● Low | ○ Isolate — 3002 |
| Nov-10-2020 8:02:44 AM | rodrigo@menlosecurity.com | https://www.cnn.com | News | Page Request | ● Low | ○ Isolate |
| Nov-8-2020 3:31:56 PM | rodrigo@menlosecurity.com | https://www.cnn.com | News | Page Request | ● Low | ○ Isolate |
| Nov-10-2020 11:10:03 PM | rodrigo@menlosecurity.com | https://www.cnn.com | News | Page Request | ● Low | ○ Isolate |

Rows per page: 10 ▼  1 - 6 of 6

FIG. 30A

TRANSPARENT WEB BROWSING RECORDER

CROSS REFERENCE TO OTHER APPLICATIONS

This application claims priority to U.S. Provisional Patent Application No. 63/019,592 entitled TRANSPARENT WEB BROWSING RECORDER filed May 4, 2020 which is incorporated herein by reference for all purposes.

BACKGROUND OF THE INVENTION

One way that nefarious individuals perpetrate computer attacks is by exploiting browser vulnerabilities. When an unsuspecting user visits a website hosting malicious content, that user's browser can by compromised and the compromise can further be extended to other resources on the user's computer or accessible via the user's computer. Exposure to known threats can sometimes be prevented by having users routinely apply patches or otherwise update their browsers. Unfortunately, many users lack the skill or knowledge to keep their browsers up to date (or run legacy browsers for which such patches/updates are not available) and thus remain vulnerable to preventable attacks. Approaches such as having patches automatically applied can reduce but not eliminate risk. For example, even browsers diligently kept up-to-date can be compromised by zero-day and/or other attacks that the browser is not capable of withstanding. Computer attacks can be perpetrated in other ways as well, even when fully up-to-date systems are involved. As one example, a nefarious individual can attempt to trick unsuspecting end users into interacting with malicious websites by making those malicious sites appear to be legitimate. As another example, a malicious end user can attempt to surreptitiously exfiltrate confidential or other sensitive information out of an organization without authorization, such as by providing that information to an external website. Accordingly, ongoing improvements to securing computing interactions (e.g., with browsers and websites) are desirable.

BRIEF DESCRIPTION OF THE DRAWINGS

Various embodiments of the invention are disclosed in the following detailed description and the accompanying drawings.

FIG. 10 illustrates an example of an interface.
FIG. 11 illustrates an example of an interface.
FIG. 12 illustrates an example of an interface.
FIG. 13 illustrates an example of an interface.
FIG. 14 illustrates an example of an interface.
FIG. 15 illustrates an example of an interface.
FIG. 16 illustrates an example of an interface.
FIG. 18 illustrates an example of an interface.
FIG. 20 illustrates an example of an interface.
FIG. 26 illustrates an embodiment of an administrative interface as rendered in a browser.
FIG. 27 illustrates an embodiment of an administrative interface as rendered in a browser.
FIGS. 28A-28D illustrate interfaces for configuring browser recordings.
FIGS. 29A-29D illustrate interfaces for configuring browser recordings.
FIG. 30A illustrates an example of an interface for reviewing a set of logs.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. EXAMPLE ENVIRONMENT

Figure 1:
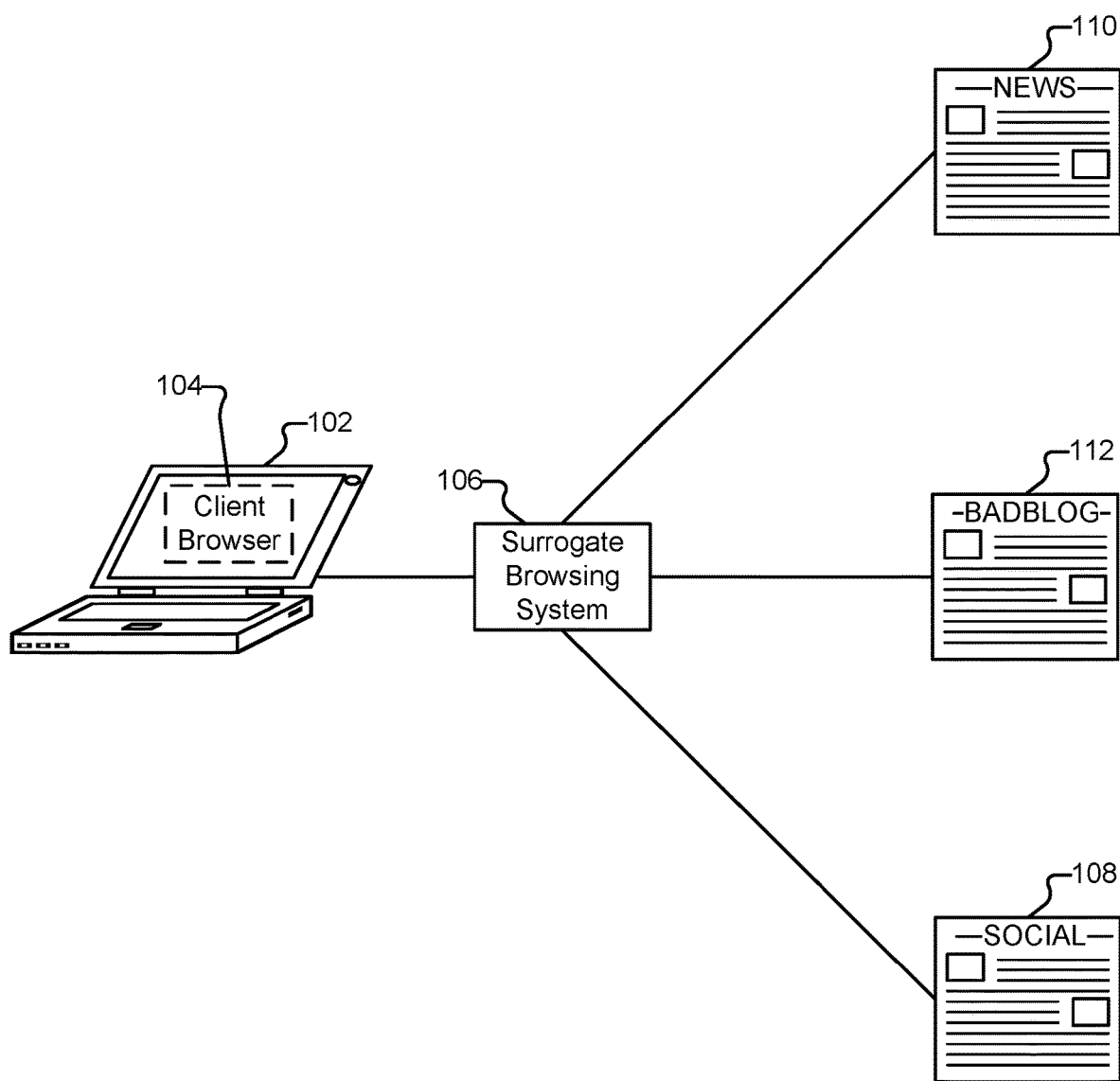
FIG. 1 illustrates an embodiment of an environment in which surrogate browsing services (also referred to herein as isolated browsing services) are provided.

FIG. 1 illustrates an embodiment of an environment in which surrogate browsing services (also referred to herein as isolated browsing services) are provided. In the example shown, client device 102 (e.g., a laptop computer) is executing a client browser application 104. Embodiments of the techniques described herein are applicable to a variety of client devices and browser applications. For example, desktop computers, tablet devices, smartphones, game consoles, and set top boxes are all examples of client devices. Client browser 104 can similarly be one of a variety of browsers, including: a legacy browser (e.g., that is no longer supported/maintained); a browser for a mobile device such as a phone or tablet; a modern browser that is not current on its patches/updates; and/or a modern browser whose patches are up-to-date.

Suppose a user of client 102 (hereinafter referred to as "Alice") has an account on social networking website 108. Via site 108, Alice learns about news articles that are of interest to her friends. For example, Alice's friend, Bob, might include in his profile on site 108 a link to a news article about a solar eclipse. The news article is located on news website 110. While website 110 is legitimate, suppose it has unfortunately been compromised and is perpetrating drive-by download attacks. If Alice were to visit website 110 directly using client browser 104, Alice's browser would quickly be compromised. If, instead, Alice used the services of surrogate browsing system 106, Alice's browser would be protected. As will be described in more detail below, in various embodiments, surrogate browsing system 106 provides protection to browsers such as browser 104 by obtaining and rendering content on behalf of users, and then transmitting a representation of that content on to the client browser.

The surrogate browser can perform all dynamic rendering of a page, including potentially dangerous JavaScript. As will be described in more detail below, in some embodiments, after the page has been rendered by the surrogate, a transcoding engine transcodes the page layout of the rendered page in the surrogate browser and sends it to the client in the form of layout updates, canonicalized Cascading Style Sheets (CSS), and/or canonicalized images or other resources. Third party JavaScript and/or plugins, and malformed images/CSS are not sent to the client. Users, such as Alice, can interact with the representations, such as by clicking on links—resulting in safe and enjoyable user experiences.

System 106 is illustrated as a single logical device in FIG. 1. As will be described in more detail below, in various embodiments, system 106 is a scalable, elastic architecture and can comprise several distributed components, including components provided by one or more third parties. Further, when system 106 is referred to herein as performing a task, such as transmitting or processing data, it is to be understood that a sub-component or multiple sub-components of system 106 (whether individually or in cooperation with third party components) may cooperate to perform that task. As one example, system 106 can comprise a single (or multiple) Amazon EC2 instances. Such instances can be geographically distributed—located at data centers around the world.

Figure 2A:
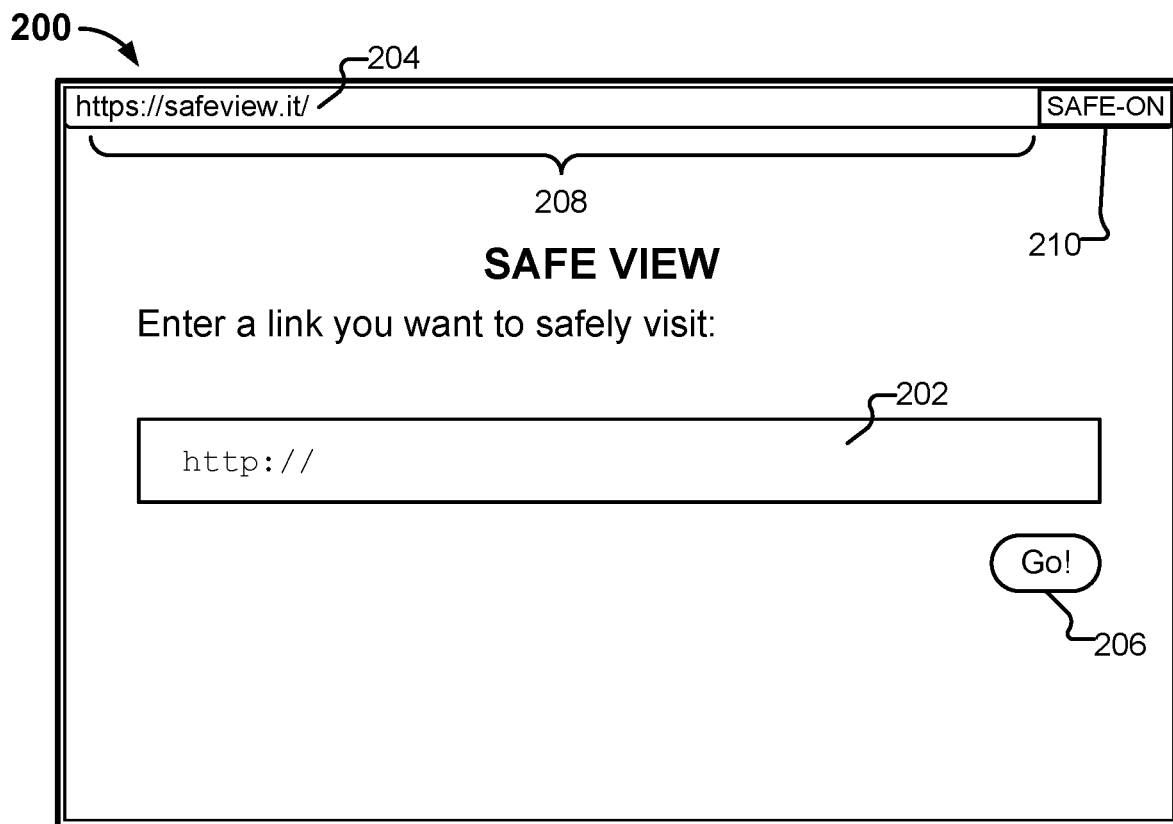
FIG. 2A illustrates an embodiment of an interface as rendered in a browser.

Depicted in FIG. 2A is one example way that Alice can avail herself of the surrogate browsing services of system 106. In particular, FIG. 2A illustrates an embodiment of an interface as rendered in a browser. As shown, Alice has navigated to page 204 using her browser 104. Interface 200 is a web page served by system 106. Alice enters the URL of the page she wishes to securely visit (e.g., http://example-news.com/solareclipse.html) by typing the URL into box 202 and selecting button 206. The services of system 106 can also be accessed in a variety of other ways. For example:

Alice can manually prepend the URL of the page she wishes to securely visit (examplenews.com/solareclipse.html) with a URL associated with system 106 (e.g., https://safeview.it) in URL bar 208. An example of such a composite URL is depicted at 252 in FIG. 2B.

A browser plugin installed on client browser 104, and/or native functionality of client browser 104, as applicable, can be configured to cause Alice's request for site 110 to be directed through system 106. As one example, a toggle button 210 can be included in the browser that allows Alice to toggle whether all (or none) of her web browsing is routed through system 106. As another example, a context menu can be added so that when Alice right-clicks a link (or otherwise activates the context menu), she can select a "view this link safely" option that opens the link using the services of system 106. As yet another example, browser 104 can be configured so that whenever it is launched by Alice's email client (e.g., because Alice has clicked on a link in an email), browsing traffic is routed through system 106. As yet another example, Alice (or another appropriate entity) can specify a whitelist of sites for which the processing of system 106 is not needed/desired (e.g., Alice's banking website) and have all web browsing activity outside of sites included on the whitelist processed by system 106.

The services of system 106 can be integrated into site 108 in a variety of ways. For example, site 108 can be configured to display a "view this link safely" button next to links that are not included in a whitelist of sites (e.g., the top 200 Internet domains). The button can also be made available next to all links—not just those that appear on a whitelist.

System 106 can also provide a URL shortening service (e.g., to site 108) in which all URLs posted by users to site 108 (e.g., http://examplenews.com/solareclipse.html) are replaced with URLs that direct requests through system 106. An example of such a shortened URL is https://safeview.it/7x83dh37. In some embodiments, only some URLs posted to site 108 are shortened (or otherwise changed to system 106 links). For example, site 108 (or another appropriate entity) can maintain a whitelist of sites for which a user is allowed to directly access via links uploaded to site 108. For any other link appearing on site 108 (and/or for links that are determined to be suspicious), the URL shortening service is used. One example of a malicious site is site 112, a blog that hosts pictures of kittens in the hopes of attracting visitors to download malicious applications under the guise of such downloads being kitten-oriented screen savers.

Anti-phishing and other browsing protection software can be integrated with services provided by system 106. For example, instead of blocking a user's access to a suspicious site, or merely warning the user that the site she is about to visit could be malicious, attempts by a user to access suspicious pages can be routed through system 106. In that way, the user can both satisfy her desire to visit the suspicious site and avoid compromising her computer.

System 106 can also be configured to provide protection services by operating in an enterprise mode, described in more detail below. In some embodiments, when running in enterprise mode, system 106 is collocated with other infrastructure of the enterprise, such as by being on premise with the clients that use the system. In other embodiments, the system uses third party services, such as Amazon EC2.

Figure 2B:
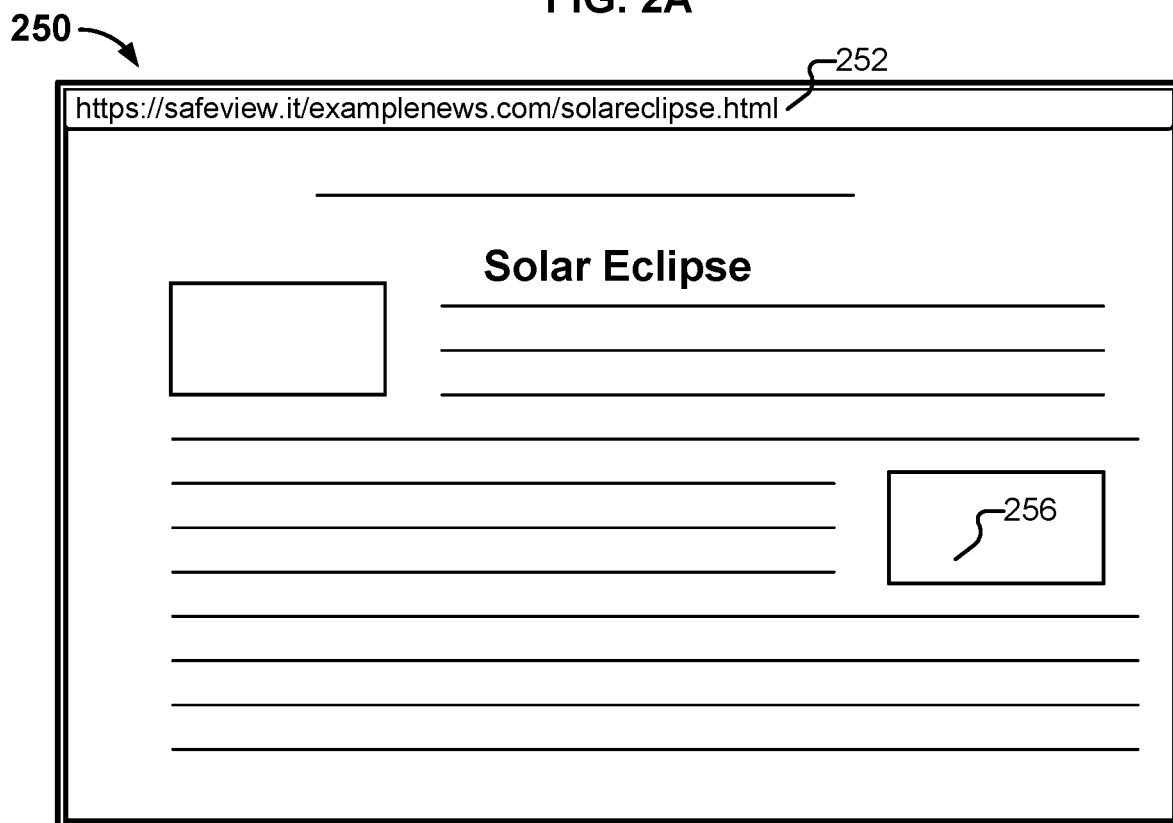
FIG. 2B illustrates an embodiment of an interface as rendered in a browser.

FIG. 2B depicts interface 200 after Alice has typed (or copy and pasted) the URL "examplenews.com/solareclipse.html" into box 202 and pressed button 206. In some embodiments, the content displayed in interface 250 appears, to Alice, to be identical to the content that would have been shown to her if she had visited the page "example-news.com/solareclipse.html" directly with her browser. As will be described in more detail below, system 106 has fetched the content from site 110 on behalf of Alice, and has processed the received content to generate a representation of the content that is then provided by system 106 to client 102. Also, as will be described in more detail below, surrogate browsing system 106 can be configured in a variety of ways and use a variety of techniques to transform the content it receives (e.g., from site 110) prior to transmitting a representation of the content to client 102.

Figure 3:
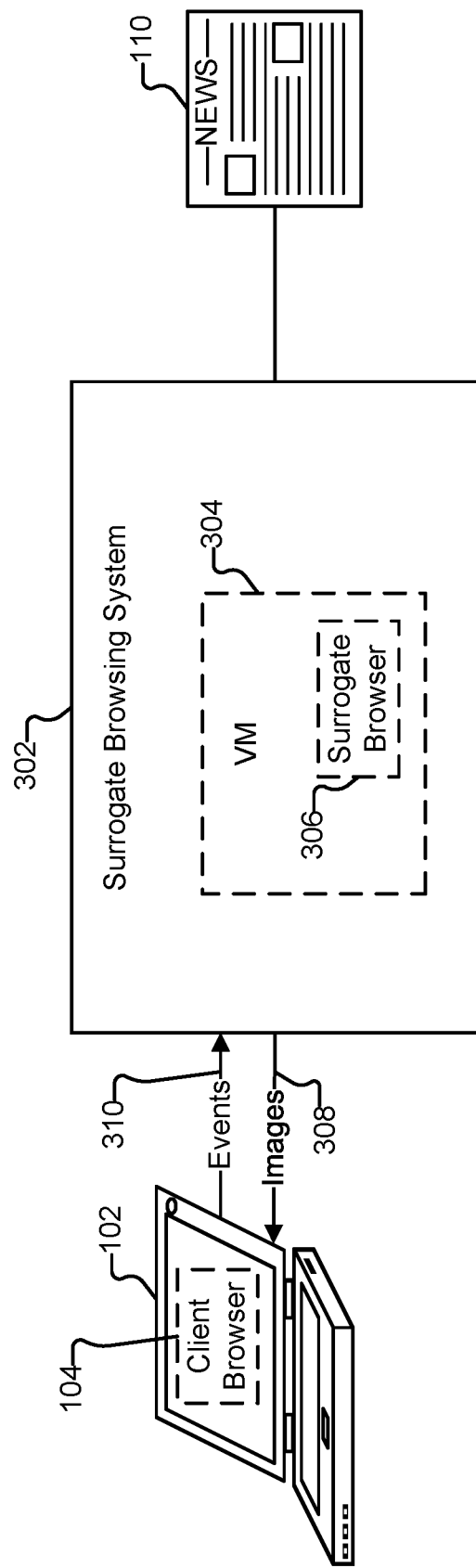
FIG. 3 illustrates an embodiment of a surrogate browsing system.

FIG. 3 illustrates an embodiment of a surrogate browsing system. Surrogate browsing system 302 is one embodiment of surrogate browsing system 106. When Alice connects to system 302, her client browser 104 receives JavaScript that facilitates communication with system 302 via the remote framebuffer (RFB) protocol. As one example, the JavaScript can implement a Virtual Network Computing (VNC) client. Other graphical desktop sharing technologies can also be used in conjunction with the techniques described herein, as applicable.

In the example shown in FIG. 3, when Alice requests access to a page on site 110 (e.g., by clicking submit button 206), a virtual machine 304, in which a surrogate browser application 306 is executing, is made available to browser 104. An image of the page is sent by surrogate browsing system 302 to client 102 (308). In some embodiments, the image sent to Alice is transcoded so that, for example, an attacker cannot send malicious pixels to Alice. When Alice interacts with the image via her browser 104, her events, such as mouse clicks and keyboard presses, are observed and transmitted by the JavaScript executing on client 102 to virtual machine 304 (310). System 302 interprets the received events (e.g., by overlaying the position of the events on Alice's rendering of the page on top of the page as seen by system 302) and surrogate browser 306 takes the corresponding actions with respect to site 110, if applicable. For example, if Alice attempts to click a link on the page she is viewing, her click event is sent to system 302 and browser 306 replicates Alice's click on site 110. If Alice is randomly clicking in white space, in some embodiments, the event is not replicated to site 110. As browser 306's view of the page changes (e.g., a new page is displayed due to following a link), updated images are streamed to Alice's browser 104.

The surrogate browsing approach depicted in FIG. 3 will protect Alice's computer 102 against attacks, such as drive-by downloads and zero-day exploits, that may be present on site 110. Further, with respect to certain websites (e.g., ones with relatively simple layouts), Alice may be unable to distinguish between the experience of accessing the site directly with her browser, or accessing the site using surrogate browsing system 302. The approach shown in FIG. 3 can also be used to allow Alice to safely use certain types of browser plugins (on the surrogate browser) such as Flash. Interaction with some sites, however, using system 302, may be too slow or otherwise less enjoyable for Alice. Other surrogate browsing approaches can also be used, and in particular, will provide good performance even when used in conjunction with more sophisticated sites (e.g., sites with interactive games, and/or which require context such as the position of scroll bars, look of widgetry, and size of internal frames).

As will be described in conjunction with FIG. 4, one alternate surrogate browsing approach is to render a page in a surrogate browser and transcode the layout of the rendered page in a secure manner before sending it to the client browser. One example of such transcoding is to have a dynamic transcoder encode the Document Object Model (DOM) layout of the rendered page and send DOM updates that describe the DOM of the page using a DOM update command language to the thin client layer of the client browser. The dynamic transcoder can also transcode resources such as images and CSS files into sanitized, canonicalized versions for clients to download. In particular, the dynamic transcoding involves the use of two components—a DOM transcoder, and a resource transcoder for transcoding images and CSS. The output of both components passes through a checker proxy that validates the data against a security policy before sending it to the client. A command interpreter running in the client browser interprets the DOM update commands and updates the DOM in the client browser accordingly.

Figure 4:
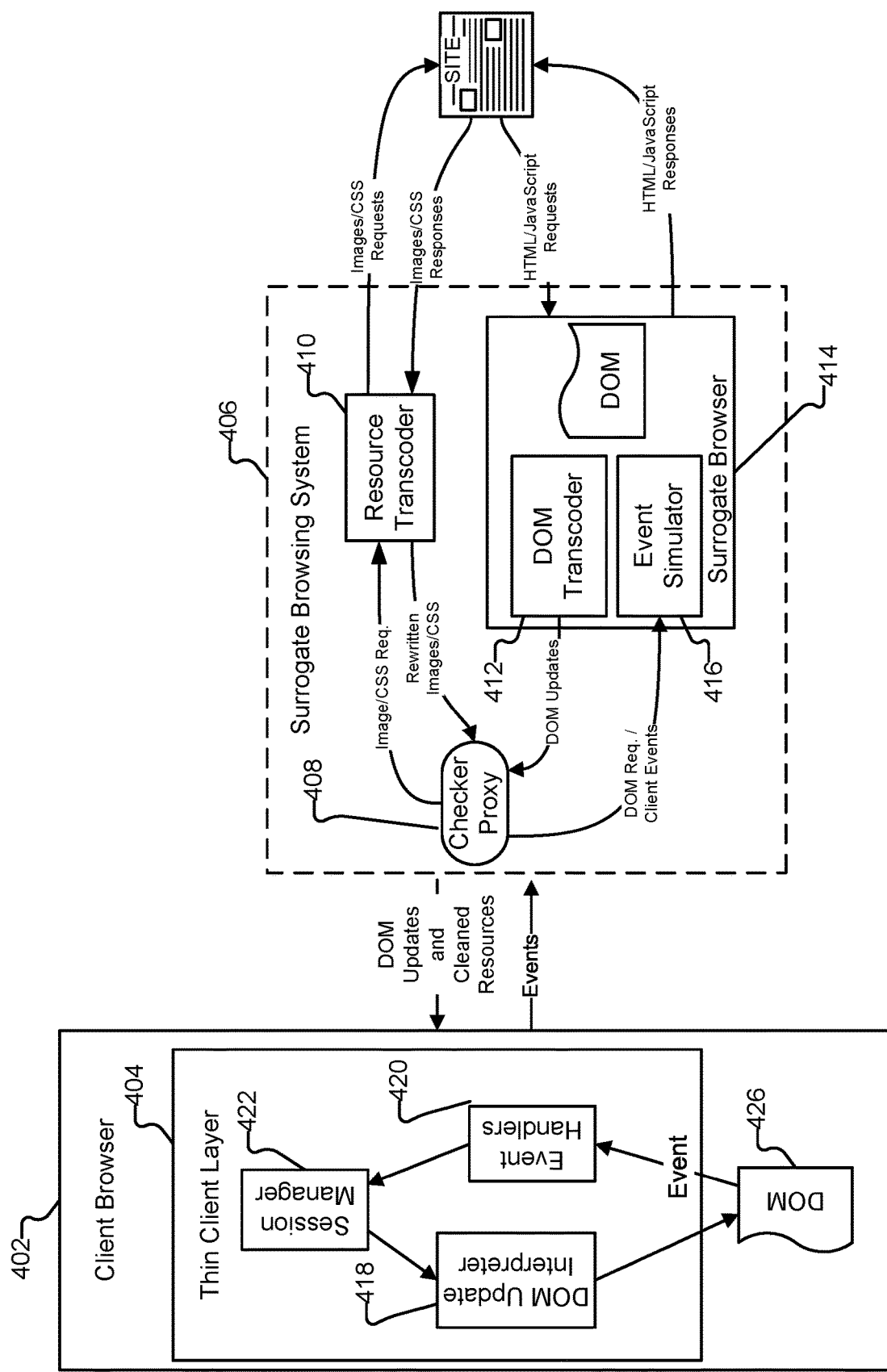
FIG. 4 illustrates an embodiment of a surrogate browsing system.

FIG. 4 illustrates an embodiment of a surrogate browsing system. Surrogate browsing system 406 is one embodiment of surrogate browsing system 106. Client browser 402 is one embodiment of client browser 104. As shown, an unmodified (i.e., stock) browser 402 is executing a thin client layer 404, which is discussed in more detail below. Among other components, system 406 includes a checker proxy 408, a resource transcoder 410, and a surrogate browser 414 that includes a DOM transcoder 412 and an event simulator 416. As explained above, system 406 can comprise scalable, elastic hardware, and can comprise several distributed components including ones provided by one or more third parties. In the example shown, system 406 uses the Amazon Elastic Compute Cloud (Amazon EC2) infrastructure.

When a client initiates a browsing session with system 406, system 406 sends a thin client layer 404 (e.g., signed JavaScript) to the client browser (e.g., 402) that decodes and interprets layout updates, images, and CSS from the surrogate browser. It also intercepts user events and forwards them to the surrogate browser. No client-side installation (e.g., of an agent) is needed. Maintenance is performed on the server-side (e.g., on system 106) and any needed updates can be pushed as new JavaScript to client 102. In some embodiments, thin client layer 404 is also configured to use the techniques described in conjunction with FIG. 3, where needed, such as if Alice navigates to a page that requires the use of a Flash plugin or includes the <canvas> tag.

Requests from client browser 402 for system 406 are received by a reverse proxy which routes the requests based on type. If the client is asking for a new page (e.g., because Alice has just clicked button 206), system 406 selects a new surrogate browser to provide surrogate browsing services to the client. In some embodiments, a load balancer is used to help determine which virtual machine should be assigned. A given virtual machine image can support many surrogate browsers. In turn, a given hardware node can support many virtual machines. If the request implicates an existing session (e.g., Alice has hit the "reload" button), the reverse proxy routes the handling of the request to the previously-used surrogate browser.

In some embodiments, one surrogate browser is assigned for a given client, per tab, per domain. Each surrogate browser is sandboxed to provide isolation between surrogate browsers (e.g., using a Linux Container). Thus, for example, if Alice has open two tabs in browser 402 (e.g., one to site 110 and one to site 112), two different surrogate browsers will provide services to her. If Alice navigates away from one of the sites (e.g., navigates from site 110 to site 108), the surrogate browser providing Alice services with respect to site 110 will go away, and a fresh surrogate browser will provide services with respect to site 108. Other configurations are also possible. For example, Alice could be assigned a single surrogate browser per session, a surrogate browser per tab (irrespective of which sites she visits in the tab), a surrogate browser per site (irrespective of the number of tabs she has open to that site), etc. Embodiments of individual components of the environment shown in FIG. 4 will now be described.

A. Surrogate Browsing System 406

1. Surrogate Browser 414

Surrogate browser 414 is a Webkit-based browser (or other appropriate browser) running inside a Linux container—a lightweight and disposable sandboxing environment. The surrogate browser renders requested pages and runs JavaScript code within the pages. It also contains an event simulator component 416 that applies user interaction events (e.g., 310) received from client 102.

2. DOM Transcoder 412

The surrogate browser also includes a DOM Transcoder component 412. As described in more detail below, client browser 402 handles DOM updates from surrogate browser 414. The surrogate browser intercepts all DOM mutation events and translates those events using the DOM transfer command language before transmitting them through checker proxy 408 to client browser 402. Surrogate browser 414 detects DOM updates by installing JavaScript DOM update handlers in the surrogate page. One way to do this is to customize Webkit to support all types of DOM mutation events and to generate the events during the initial construction of the DOM. When generating DOM commands to send to client 102, surrogate browser 414 first passes them through a whitelist that removes, among other things, all JavaScript. It also rewrites all URLs to point to through system 106. The <iframe> tag is treated specially: no source URL is sent to client 102. This allows thin client layer 404 to render content from multiple origins without violating a same-origin policy. Surrogate browser 414 enforces the same-origin policy, but handles all interactions and updates for the iframe as for a normal top-level document, with the exception that updates are directed to the top level page in the client browser. Since no JavaScript reaches client browser 402, and all external resources are passed through system 406, it is not possible for a site to convince client browser 402 to implicitly violate the same-origin policy without first compromising surrogate browser 414 and checker proxy 408.

3. Resource Transcoder 410

The techniques described herein can be used to allow a user, such as Alice, to view web pages that include such features as images and CSS, without being subject to compromise. In various embodiments, system 106 is configured to serve a canonicalized copy of such resources instead of the original ones (or, instead of preventing them from being displayed at all). In the example shown, the rewriting of images and CSS is performed by resource transcoder 410. In particular, surrogate browsing system 406 rewrites the URLs of external images and CSS to redirect client browser resource requests to resource transcoder 410, which then serves the client a cached and harmless copy of the resource. Surrogate browsing system 406 handles inline images and CSS by forwarding the inline resources to resource transcoder 410 and then substituting them with the ones returned by the transcoder.

As one example, transcoder 410 can transcode images by reading in the file from an input file descriptor and parsing the image from its original format. It then adds cryptographic random noise to the lower-order bits of the pixel data and rewrites the image to its original format, stripping unneeded metadata which can be used as attack vectors. Checker proxy 408, described in more detail below, can cryptographically verify that the noise was added before sending the image data to the client. Other media types can similarly be processed. For example, audio and video files can have noise randomly inserted to reduce the likelihood of an embedded attack payload. Other transformations can also be made and need not rely on the use of cryptographic functions. Modifications made by resource transcoder 410 are also referred to herein as inserted modification data.

4. Checker Proxy 408

Checker proxy 408 is configured to validate that the surrogate browser is generating DOM commands and resources as expected. In some embodiments, the checker proxy runs on a separate server from the surrogate browser(s). The checker proxy proxies all calls between client browser 402 and surrogate browser 414. In some embodiments, the checking is performed by making sure that all messages the surrogate browser sends to the client conform to the command language described below.

In some embodiments, the checker first verifies that the commands are all valid JSON. It then passes each individual command through a whitelist filter for that particular command. For example, the "DOM_add_element" command has a list of valid tags and attributes. Any tags and attributes not on that list cause checker proxy 408 to reject the command and terminate the connection between the surrogate and client browsers under the assumption that the surrogate browser will only send invalid commands if it has been compromised. In the case that the checker detects an invalid command or resource, the container for that surrogate browser is cleaned and restarted.

Checker proxy 408 also validates that all URLs it sees begin with the appropriate domain (e.g., safeview.it). This validation checks attributes against a blacklist of attributes that will contain URLs. Any such attribute is verified to begin with the safeview.it (or other appropriate) domain. If it does not, the checker assumes an attack, as above.

B. Thin Client Layer 404

The thin client layer (404) includes three logical components: a DOM update interpreter 418, client event input handler(s) 420, and a session manager 422.

1. DOM Update Interpreter 418

The DOM update interpreter 418 runs inside client browser 402 and applies incoming DOM updates to the client DOM (426) which are received when dynamic DOM transcoder 412 sends the layout of a page rendered in the surrogate cloud browser as a sequence of DOM updates to the client. The interpretation of these updates ensures that the client browser page shows the latest layout as rendered in the surrogate cloud browser. JavaScript supplies a standardized DOM manipulation API which can be used to update the client DOM based on the commands system 406 sends to client 102.

In some embodiments, DOM updates are defined using an unambiguous command language serialized using JSON. The basic element in the language is a command, which is a list that represents a DOM update. The first element in the list describes the type of update to be applied; the remaining elements are parameters. For example, the following command inserts an element into the local DOM:

[DOM_add_element, type, attributes, unique_id, parent_id, sibling_id]

This command will try to insert an element with type "type" into the DOM, with respect to its parent (parent_id) and successor sibling (sibling_id). The interpreter will also set the _uid attribute to unique_id and will add the additional keys and values in attributes to the element. The other commands are similar to this example. Additional detail regarding the command language is provided below.

2. Event Handler(s) 420

Many modern web pages are interactive—user events (e.g., key presses or mouse clicks) influence the content of the web page. Event handler(s) 420 are configured to capture any events created by a user and to make them available (via the thin client layer) to the surrogate browser in a manner that is consistent with what JavaScript running in the surrogate browser page expects. In some embodiments, all events are captured by event handler 420. In other embodiments, only those events for which an event handler is registered are listened for and sent.

3. Session Manager 422

Session manager 422 handles three tasks: managing connections with surrogate browsers, such as browser 414, emulating browsing history and page navigation, and providing cookie support.

Regarding communications management: In some embodiments, the session manager uses Websockets (in browsers that support it) and falls back to long-polling otherwise. These technologies enable full-duplex communication between the client and surrogate browsers.

Regarding history and navigation: In some embodiments, system 406 employs DOM updates to provide the illusion that the user is visiting different pages—a DOM reset command clears the current DOM and makes way for DOM updates from the new page. System 406 can provide history and navigation functionality in a variety of ways. As one example, system 406 can instruct client browser 402 to modify its browser history after every navigation action. To ensure that cookie state persists across client browser sessions, system 406 mirrors surrogate cookies in the client, and employs a consistency protocol to keep the client and surrogate cookie jars synchronized. When the client browser initiates a new browsing session with system 406 and visits a domain, session manager 422 transmits the client's cookie jar to the surrogate for that domain only, and the surrogate in turn will install the cookies before loading the page.

C. Enterprise Mode

Figure 5:
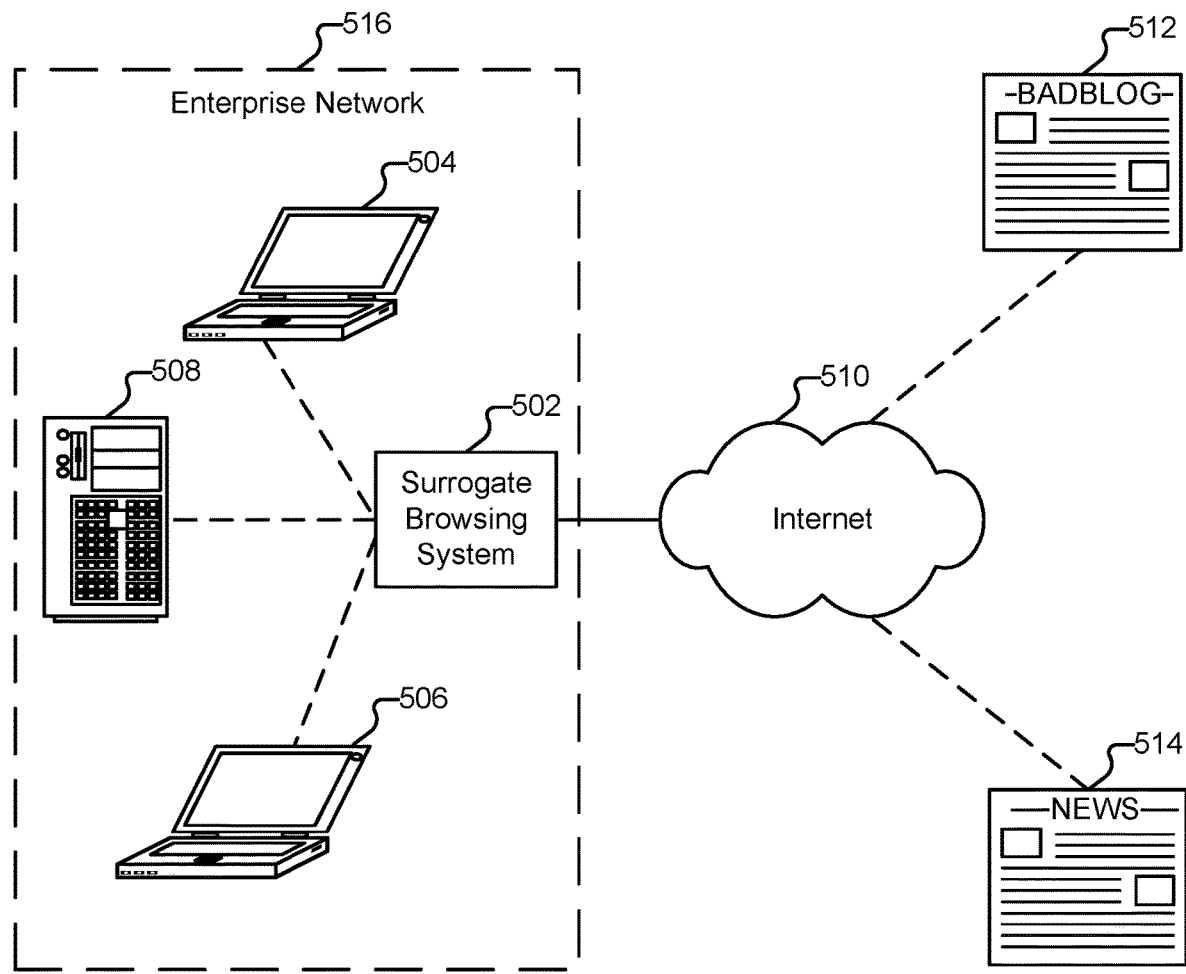
FIG. 5 illustrates an embodiment of a surrogate browsing system.

FIG. 5 illustrates an embodiment of a surrogate browsing system. In the example shown, an enterprise (e.g., the company for which a user, "Charlie," works) has deployed an embodiment of system 106 within its enterprise network 516 as an appliance. In particular, surrogate browsing system 502 is an embodiment of surrogate browsing system 106. Other entities can also use the technology described herein in enterprise mode, such as households (e.g., where a single surrogate browsing system sits at the perimeter of the home network). In the example of FIG. 5, surrogate browsing system 502 is owned by or otherwise under the control of the enterprise and comprises commodity server hardware running a server-class operating system. As one example, system 502 includes 32 GB of RAM, an 8-core AMD 4.4 GHz processor, and a Gigabit Ethernet adaptor attached to a Gigabit Ethernet network.

As shown, all web browsing traffic in network 516 destined for the Internet (510), such as traffic exchanged between client 504 and blog 512, automatically passes through surrogate browsing system 502. Other appliances may also process such traffic as applicable, such as firewall devices, and are not pictured. In some embodiments, the functionality of system 502 is incorporated into another such device, such as a firewall device.

The settings of system 502 are configurable. For example, instead of diverting all web browsing traffic through system 502, certain sites appearing on whitelists (e.g., site 514) may be accessible directly by clients 504-508, while attempts to browse suspicious sites, such as site 512, must be handled via system 502. As another example, an administrator can specify that only certain clients (e.g., client 504 and 506) must use the services of system 502, while client 508 does not. Other policies, such as whether users are alerted to the fact that their web browsing traffic is being processed by system 502 can also be configured. As yet another example, a logo, overlay, or other indicator (e.g., indicating that the browsing is being protected by system 502) can be included in the client browser.

D. Additional Information—Plugins and HTML5

Plugins such as Flash are the source of many security vulnerabilities in browsers. HTML5 includes tags such as the <canvas> tag, native audio and video support, WebGL, and other features. These tags either include new content streams that may expose vulnerabilities similar to those in images, or new JavaScript calls that must run on the client.

As mentioned above, in some embodiments, such plugins are handled by surrogate browsing system 106 by using an unoptimized VNC approach to render the graphical content directly in the browser. Certain plugins can be optimized for, such as Flash support. So, for example, video can be handled similarly to images—by transcoding the video signal and adding noise to reduce the risk of attack, and then passing the video through to our own video player, such as by using the <video> tag.

E. Additional Information—Command Language Embodiment

In some embodiments, the thin client layer uses only a small subset of the JavaScript DOM API in order to limit the attack surface. For example, the client can be configured to accept twenty commands, which together call only nine DOM API functions. The client JavaScript does not contain any other API calls, and as such is not vulnerable to these attack vectors. This is in comparison to the more than thirty DOM API calls which typical modern browsers support. The command language does not permit regular expressions.

Because all input to the client passes through checker proxy 408's whitelist, each function is called only with canonical arguments. The command language can only produce DOM trees, and it guarantees that all nodes will be unique and live. It achieves these properties by never permitting the attacker from holding a direct reference to a DOM node and by not permitting nodes to be copied or moved. All references are done through names that look up the relevant node in a dictionary. If a node needs to be moved, a new node is generated with the same attributes, and the old node is deleted. This removes two possible attack vectors: it is not possible to create circular graph structures, and deleted nodes cannot be referenced. The following is an example of a specification of a DOM command language:

The basic element in the DOM command language is a command, which is a list that represents a single DOM update. The first element in the list describes the type of update to be applied and the remaining elements are parameters. The checker proxy and the thin client layer recognize only a predefined number of command types.

| Schema | Description |
| --- | --- |
| DOM_add_element, type, attributes, unique_id, parent_id, sibling_id, frame_id | Add a type element with attributes with respect to the parent and sibling. |
| DOM_remove_element, unique_id, frame_id | Remove an element. |
| DOM_modify_attribute, unique_id, attribute, value, frame_id | Set attribute value of an element to value. |
| DOM_add_cdata, type, unique_id, parent_id, value, frame_id | Add type character data value with respect to the parent. |
| DOM_change_cdata, unique_id, value, frame_id | Change character data to value. |

Table 1: Part of the DOM command language specification. Unique id and frame id are attributes that maintain the mapping between the client and remote DOM nodes.

Table 1 includes some examples of the DOM command language specification. The number of parameters varies depending on the command type. Concrete examples are shown in Table 2.

DOM_add_element, "div," [["id," "example"], ["class," "mainCSS"]], "123121," "245564576," "12353123," "13443253456"

DOM_modify_attribute, "123121," "id," "changed," "13443253456"

DOM_remove_element, "123121," "13443253456"

Table 2: Example of DOM update sequence. A div element is added to the DOM. Then, its id attribute is changed. Finally, the element is removed from the DOM.

First, the div element is added to the DOM with respect to the parent node, the sibling node, and the frame. At the same time, its attributes id and class, defined as a list of attribute-value pairs, are updated as well. After the insertion, the element's id attribute is changed to value "changed." Finally, the element is removed from the DOM.

a) DOM_inject_script, "javascript:do_bad_things()"
b) DOM_add_element, "script," [["type," "JavaScript"]], "123121," "245564576," "12353123," "13443253456"

Table 3: Example of unsuccessful attacks. In case a), the checker will not recognize a new command and classify it as a malicious activity. In case b), the checker will, using whitelists, observe that the attacker is trying to inject a script and classify it as an attack.

To compromise the client, the attacker needs to send a message that conforms to the DOM command language. The attacker may try to attack the thin client layer in a number of ways, for example: 1) to craft a command with a new type or 2) to use an existing command type but with bad parameters. In the first case, the attempt will fail since the checker proxy and the thin client layer only recognize a predefined set of command types. The second attack also fails in most cases, since sensitive parameters are whitelisted. Examples are shown in Table 3.

F. Example Process Used In Some Embodiments

Figure 6:
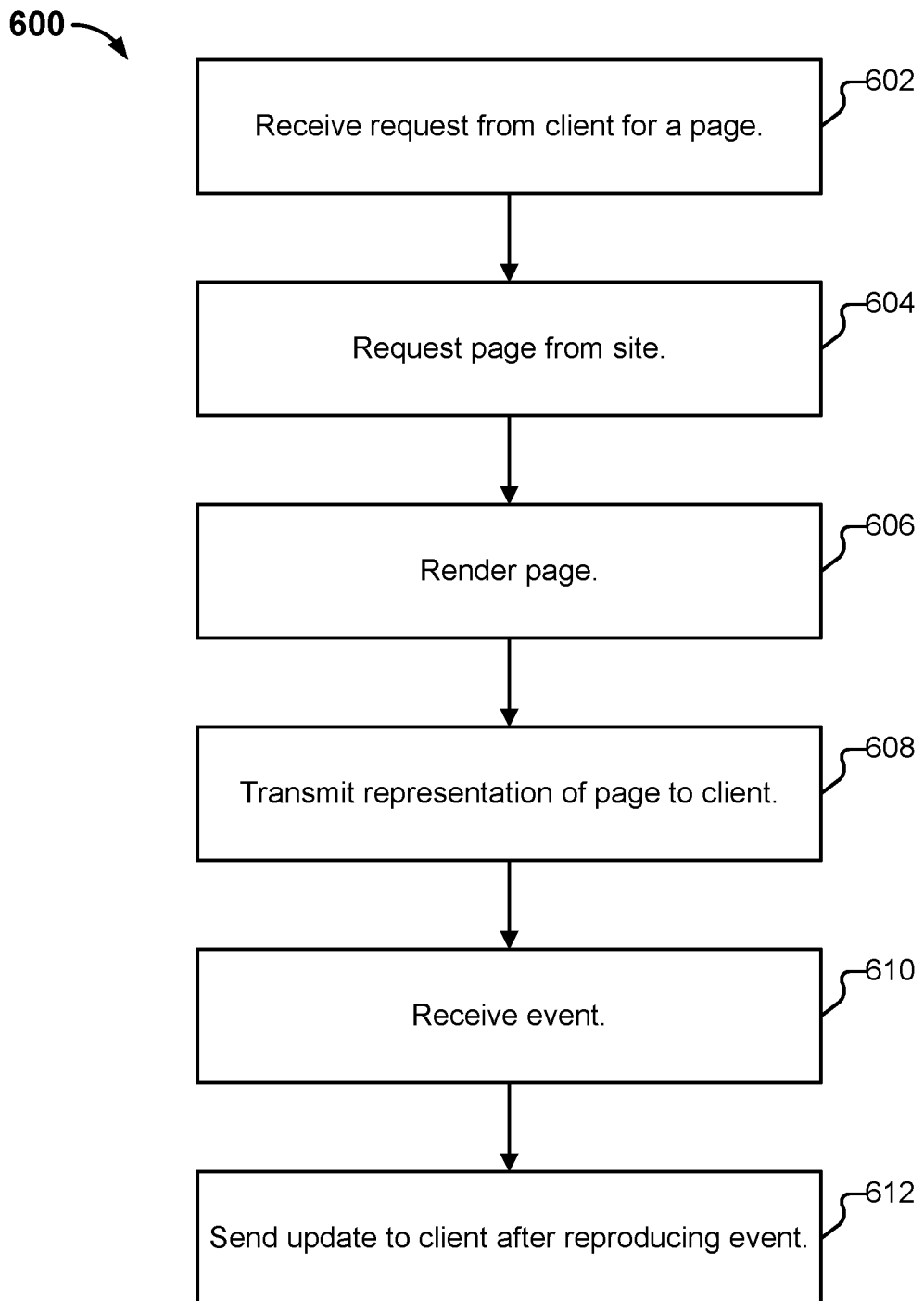
FIG. 6 illustrates an embodiment of a process for protecting a browsing session.

FIG. 6 illustrates an embodiment of a process for protecting a browsing session. In some embodiments, the process shown in FIG. 6 is performed by surrogate browsing system 106. Process 600 can also be performed by various embodiments of surrogate browsing system 106, such as system 302, system 406, and system 502, as applicable. Also, as applicable, various portions of process 600 can be repeated or omitted.

The process begins at 602 when a request from a client for a page is received. As one example, a request is received at 602 when Alice clicks on button 206 as shown in interface 200 of FIG. 2A. At 604, a page is requested from a site. As an example, system 106 requests the page, "http://example-news.com/solareclipse.html" from site 110 at 604. At 606, the requested page is rendered. As previously explained, the rendering is performed on surrogate browsing system 106.

At 608, a representation of the page is sent to the requesting client. As explained above, the page is transformed in some manner, rather than the exact web traffic being passed from the surrogate browser to the client. As one example, the representation is transmitted as an image (e.g., by system 302) at 608. As another example, the representation transmitted at 608 comprises DOM layout content.

At 610, an event is received. As one example, when Alice clicks on picture 256 of FIG. 2B, an event is sent by client 102 and received by surrogate browsing system 106 at 610. Finally, at 612, an update is sent to the client after reproducing the received event. As one example, the click event received at 610 is replicated by event simulator 416. Any resulting changes to the page as rendered in surrogate browser 414 are sent to client 102 as an update at 612—either as an updated image (e.g., in the case of system 302) or as a DOM layout update (e.g., in the case of system 406).

G. Example—Other Types of Pages

The techniques described herein can be used in conjunction with a variety of types of pages in addition to web pages (e.g., comprising HTML and resources such as images). Examples include Microsoft Word documents and documents in the Adobe Portable Document Format (PDF). As one example, an embodiment of surrogate browsing system 302 can be configured to transmit images of a Word document to client 102 (whether via browser 104 or a different application) and to receive events associated with a user's interactions with the Word document. As another example, PDF documents can be rendered in a surrogate viewer and an embodiment of system 302 can be configured to send images of the rendered PDF views to a client.

Embodiments of system 406 can similarly be configured to provide more sophisticated surrogate viewing/editing of documents, such as PDF documents. As one example, PDF documents can be rendered in a surrogate viewer, their internal structures obtained, and encoded prior to sending to a client (e.g., by an embodiment of system 406).

II. ADDITIONAL EXAMPLE ENVIRONMENT

Figure 7:
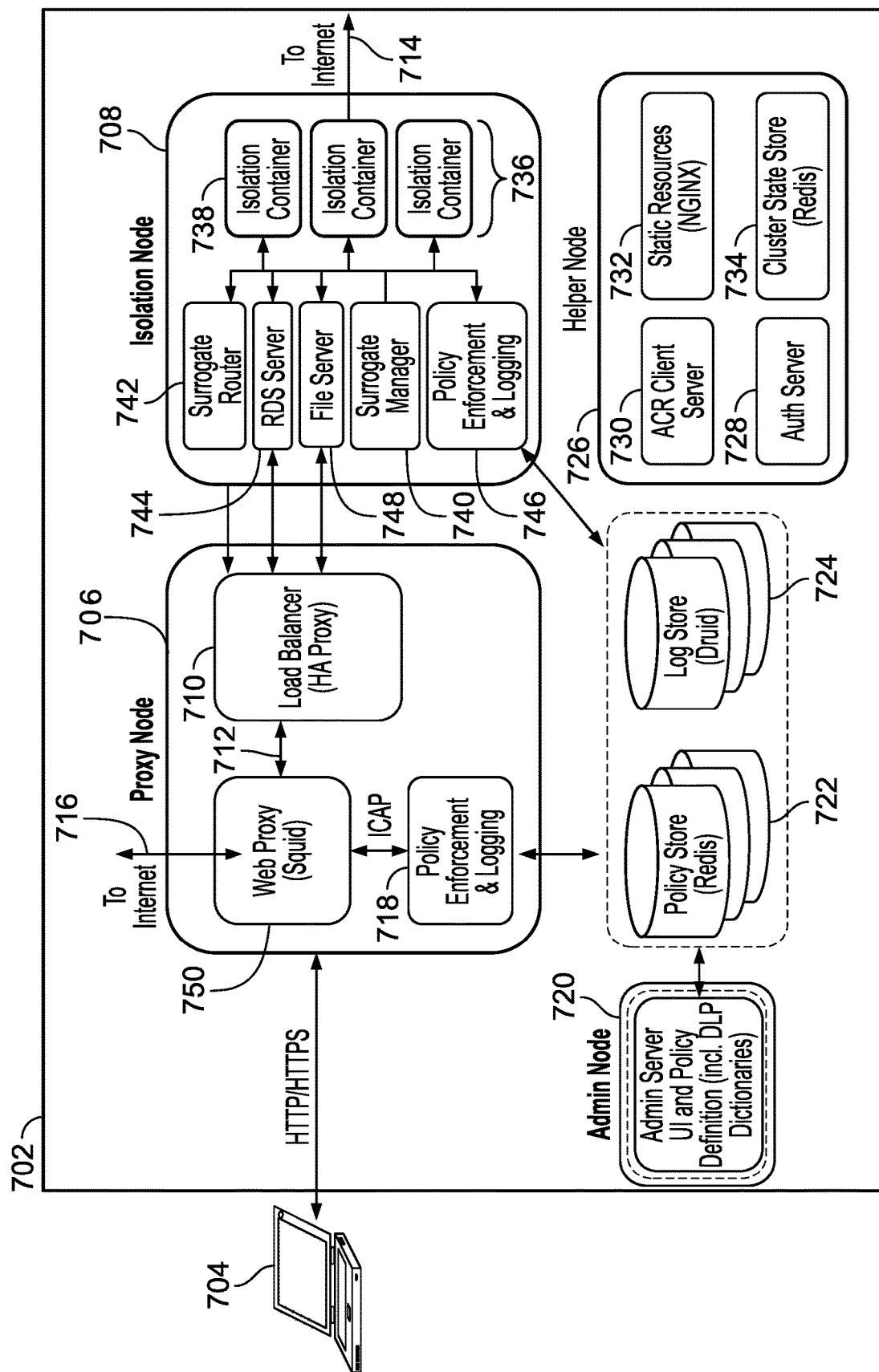
FIG. 7 illustrates an embodiment of an environment in which surrogate browsing services are provided.

FIG. 7 illustrates an embodiment of an environment in which surrogate browsing services are provided. Surrogate browsing system 702 is an embodiment of surrogate browsing system 106. In this example, surrogate browsing system 702 comprises a set of nodes (e.g., each running on Amazon EC2 instances, running a server class operating system such as Ubuntu). While a single node of each type is depicted in FIG. 7, in various embodiments, multiple instances of particular node types are used (e.g., for scalability/performance). As an example, each cluster of isolation, helper, and proxy nodes is configured in a separate AWS Auto Scale group to provide per-cluster elasticity as demand increases and decreases.

Proxy node 706 acts as a gateway to surrogate browsing system 702. Users of surrogate browsing system 702 (e.g., using client 704) enter surrogate browsing system 702 via proxy node 706. As applicable, proxy node 706 performs tasks such as authenticating the user. In some scenarios (e.g., based on a policy applicable to client 704), all of a user's traffic is passed through an isolation node 708 (via load balancer 710). This is illustrated in part, via paths 712 and 714. In other scenarios, some traffic is passed through an isolation node 708, while other traffic is not (illustrated in part, via path 716). Even where the client's traffic is not passed through an isolation now, as applicable, policy enforcement (e.g., allow/block) and logging can still be provided by module 718 of proxy node 706. One way of implementing module 718 is by using node.js. In the environment shown in FIG. 7, policies (configurable, e.g., via administration node 720) are stored in policy store 722 and logs are stored in log store 724.

As applicable, proxy node 706 can be configured to provide data loss (or leak) prevention (DLP) services to traffic associated with client 704. This can be helpful, e.g., where client 704's traffic exits to the Internet via path 716, rather than through isolation node 708. As will be described in more detail below, more robust DLP services can be provided when client 704's traffic is processed through isolation node 708.

Helper node 726 generally provides supporting functionality to isolation node 708. For example, helper node 726 includes an authentication server 728 for authenticating users of surrogate browsing system 702. Further, when a client first connects to surrogate browsing system 702, Adaptive Client Rendering (ACR) client server 730 provides a copy of a thin client (stored as a static resource along with other static resources 732 such as company logos, boilerplate text, etc.) to the client browser to apply rendering/draw updated coming from the isolated browser and to relay user inputs to the isolated browser. The thin client is loaded by the client browser upon first request. Rather than return the original contents of a target page (e.g., example.com), the response instead contains the thin client's HTML that is independent of the actual content of the target page. An example of the thin client's HTML is as follows:

<!DOCTYPE html>
<html><body>
  <safeview-info build="2.60.0-36-1-g75968eb" session-info="base64(JSON(config))"></safeview-info>
  <script src='https://( . . . )/safeview-min.js?v=2.60.0-36-1-g75968eb'
type='text/javascript'></script>
</body></html>

Finally, cluster state store 734 is responsible for maintaining/synchronizing external state (e.g., which isolation container 736 is currently assigned to a client).

Although pictured in FIG. 7 as having an isolation node 708, in various embodiments, a single proxy node (e.g., proxy node 706) makes connections to many isolation nodes, as handled by load balancer 710. A given isolation node (e.g., isolation node 708) in turn makes use of many isolation containers 736 of which isolation container 738 is an example. Each isolation container comprises multiple processes each running in a sandbox comprising a Chromium Browser Process, an isolated Chromium renderer process, an isolated Flash process, and an isolated resource rewriter. A dedicated Chromium renderer process runs for each browser tab, providing isolation between tabs.

The various components of isolation node 708 can be implemented using a variety of tools, such as a combination of python scripts, C++, and node.js. Surrogate router 742 steers incoming traffic, pairing requests (to pair a client with an isolation container), etc. to an appropriate isolation container (e.g., in consultation with cluster state store 734). Surrogate manager 740 manages the isolation containers in an isolation node (e.g., keeping track of which isolation containers are busy/available, growing/shrinking the pool of isolation nodes as needed, and communicating such information with cluster state store 734). Remote desktop server (RDS) server 744 is responsible for encoding VNC updates and sending them to a client's thin client. Similar to module 718, module 746 provides policy enforcement and logging services for isolation node 708.

Finally, file server 748 is responsible for handling files uploaded (and downloaded) by clients. As an example, suppose Alice is currently accessing (via a surrogate browsing session) a web page that supports file uploads. Alice initiates a file upload (e.g., by clicking on an upload button). The surrogate browser detects that the website has initiated a request for an upload and sends a file request message to the thin client. The thin client displays a file selection dialogue on the endpoint browser, Alice selects a file, the thin client receives a file handle, and the thin client facilitates a multi-part upload of the file to the surrogate browsing system (e.g., by posting the file into the surrogate browser). Upon completion of the upload, the surrogate browser uses a REST API to inform file server 748 that a file upload has completed, at which point file server 748 can perform one or more policy checks (e.g., based on the file type which can be determined based on file extension, an introspection tool such as magic, etc., as well as the website and website categorization that the file will be uploaded to) by calling module 746. The types of checks that can be performed are pluggable/configurable by an administrator (e.g., Alice's employer, ACME Bank). Examples of such checks include multi-vendor hash checks (e.g., to determine whether the file is known to be malicious), full file scans, file detonation sandboxing, DLP, etc. If the policy checks succeed (i.e., it is determined that uploading the file to the web page does not violate any policies), the surrogate browser uploads the file to the web page. If the policy checks fail, an appropriate action can be taken based on the policy (e.g., block, log, etc.). In addition to performing checks, other actions can be specified to be taken via a REST API. As an example, ACME Bank might have a requirement that all files uploaded or downloaded to surrogate browsing system 702 be archived. As another example, ACME Bank might have a watermarking tool that is configured to watermark all documents (PDF, PPT, DOC, etc.) that are uploaded to external sites. Such tool can be called via the REST API. As another example, ACME Bank might have a redaction tool that is configured to redact or otherwise modify certain types of information from documents prior to sending them to external sites.

A similar two-stage process is performed when Alice attempts to download a file from a web page (i.e., the file is transferred from the web page to the surrogate browsing system, applicable checks are performed, and the file is then transferred from the surrogate browsing system to Alice via the thin client if policy allows). In various embodiments, surrogate browsing system 702 provides additional functionality regarding file downloads. As one example, suppose Alice is attempting to download a ZIP file. Assuming the file passes any applicable checks, Alice can be presented by surrogate browsing system 702 (via the thin client) with an option of unzipping the ZIP file at the surrogate browsing system, and only downloading portions of its contents. As another example, instead of downloading a policy-checked PDF from the surrogate browsing system to her browser, Alice can be given the option of viewing the PDF (e.g., after conversion to HTML) at the surrogate browsing system, downloading a simplified PDF, etc. Further, while the functionality of file server 748 has been described in the context of file uploads/downloads via websites, the same infrastructure can be used for handling other types of file transmission, such as email attachments. Similarly, the policy enforcement described as being performed on files can also be performed on other kinds of input, such as user input. For example, if Alice attempts to paste credit card numbers from her clipboard to a site such as pastebin.com, that input can be checked first, and blocked, as applicable.

III. PAIRING AND COMMUNICATION CHANNELS

Figure 8:
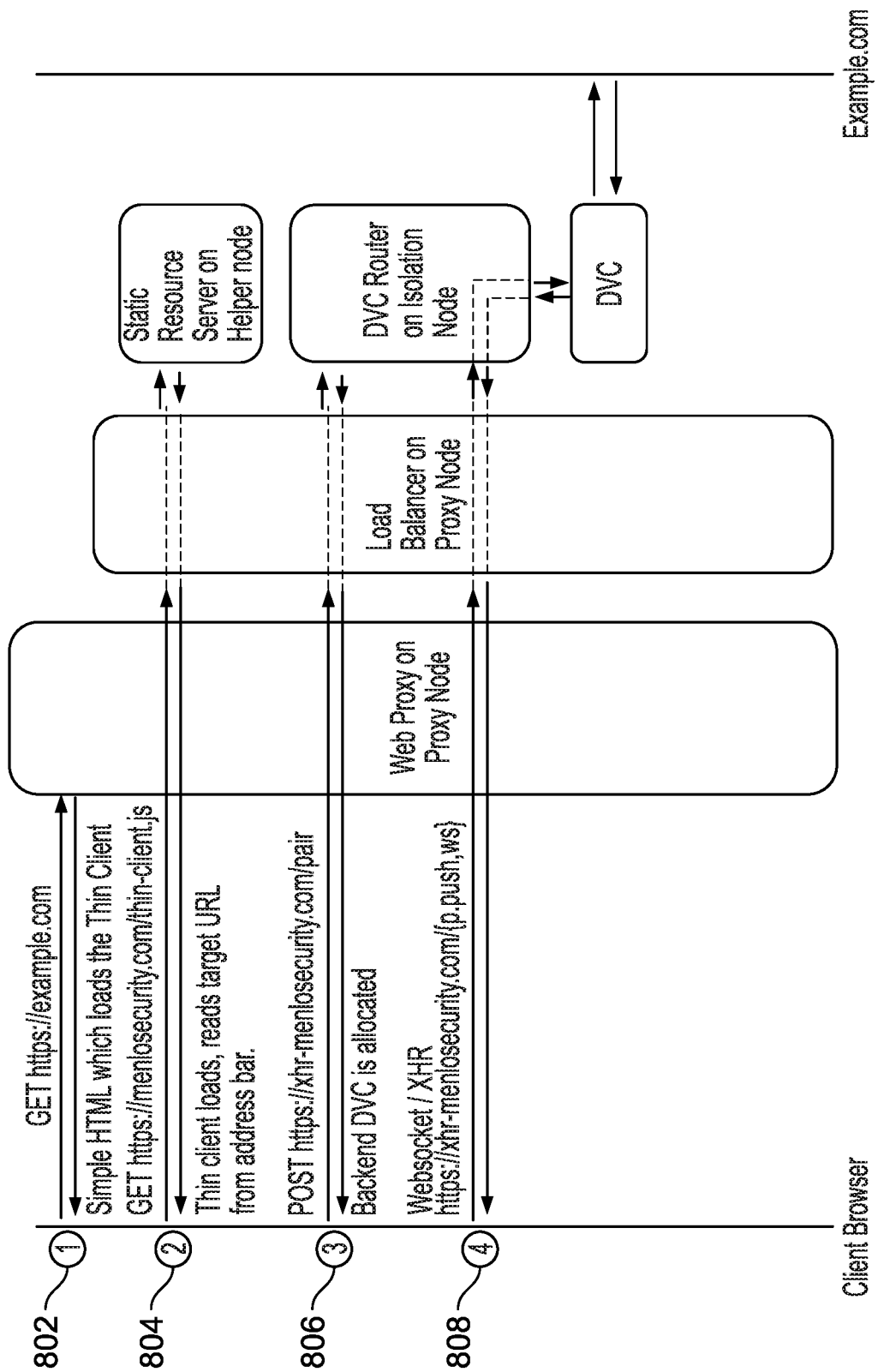
FIG. 8 is a flow diagram that illustrates the initialization of a surrogate browsing session.

FIG. 8 is a flow diagram that illustrates the initialization of a surrogate browsing session. First (802), the client browser requests a page. In the example shown in FIG. 8, the request is made to https://example.com. This is handled by proxy service 750 on proxy node 706. Proxy service 750 returns basic HTML that is independent of the site-to-be-visited. Content is not fetched from example.com in this step, but an SSL tunnel is established with example.com to allow for the mimicking of properties of the example.com certificate as part of the TLS inspection. The SSL connection to example.com is then terminated by proxy service 750.

Second (804), the HTML returned during 802 includes a tag to load JavaScript referred to herein as the "thin client." This JavaScript is loaded from helper node 726. It is the same for all visited pages and will be cached by the client browser after the first visit to any site. All SSL connections to system 702 are terminated by a load balancer.

Third (806), the thin client JavaScript starts executing in the client browser. The thin client consults the address bar to get the URL of the page the user wants to load and POSTs it to xhr-menlosecurity.com/pair. At this point, a Disposable Virtual Container (DVC), also referred to herein as an isolation container/isolated browser, is allocated for the user, if necessary. The DVC for the user is then instructed to create a tab and navigate it to example.com. The DVC starts loading example.com. At this point, no information from example.com has been sent to the client browser.

Finally (808), a communication channel with the DVC is established and information starts flowing bidirectionally to the client: rendering data flows from the DVC and user input (mouse, keyboard) flows to the DVC. This communication occurs over a Web Socket channel over TLS terminated by HAProxy on a master node if a Web Socket can be established. Otherwise (e.g., Web Socket is not supported by the client software), communication occurs via multiple XHR requests (over TLS). In various embodiments, the thin client mirrors only client browser viewport dimensions, OS, and locale settings to the isolation container. This prevents many client fingerprinting approaches (e.g., user agent, canvas, WebGL), and masks the client IP from the web servers being visited.

The thin client does not trust the isolated browser. A compromised backend browser cannot get the client to execute JavaScript or Flash. This can be achieved by having the thin client JavaScript disallow the creation of "script" nodes and "object" nodes that could host plugin content. In addition, the thin client can be loaded with a strict Content Security Policy (CSP). The CSP blocks any use of inline JavaScript and forces all resources to be loaded from menlosecurity.com hostnames.

In various embodiments, system 702 provides two types of remoting engines. The first, a DOM engine, mirrors the DOM tree and associated resources (e.g., CSS, images, fonts, SVG, etc.) from the isolated browser to the endpoint browser. By contrast, the Pixel engine sends a stream of Compositor Commits containing layers, their draw-ops, and property-trees from the isolated browser to the endpoint browser. The Pixel engine is a remote compositing rendering engine that offers a way to achieve low data-rate continuous recording. Which engine (e.g., DOM vs. Pixel) is used depends on policy: the mode can be pre-selected on a per-site and/or per-tenant basis. Alternatively, the engine can be automatically and dynamically selected based on the content of the page being selected: e.g., pages that use ShadowDOM or <canvas> can be automatically switched into Pixel mode. The ACR Protocol defines all instructions between the endpoint browser and isolation container. Examples of these instructions include:

From the server to the client:
DOM Mode: DOM manipulation instructions (create node, add attribute . . . )
  Example: ["fupd",[1,4054,"DIV",[["class","es-search-group",null]], . . . ]]
Pixel Mode: Drawing commands (draw glyph, add transparency . . . ):
  Example: DrawRect(0,0, 50, 50, paint_0),
  DrawImage(img_0),
  DefinePaint(paint_0, {color: blue; stroke-width: 2 px}),
  DefineImage(img_0, 'http://t.com/logo.png'),
  DrawTextBlob([34,45,34,56,65], paint_1),
  DefineGlyph(34, path_data)
From the client to the server:
Input events (mouse, keyboard, scroll, window size)
Navigation instructions (change page URL, create new tab)
  Example: ["keyboard", 1, 2059, "keypress", 100, 100, "d", false, false, false]
  Example: ["resize",674,903,1]

Figure 9:
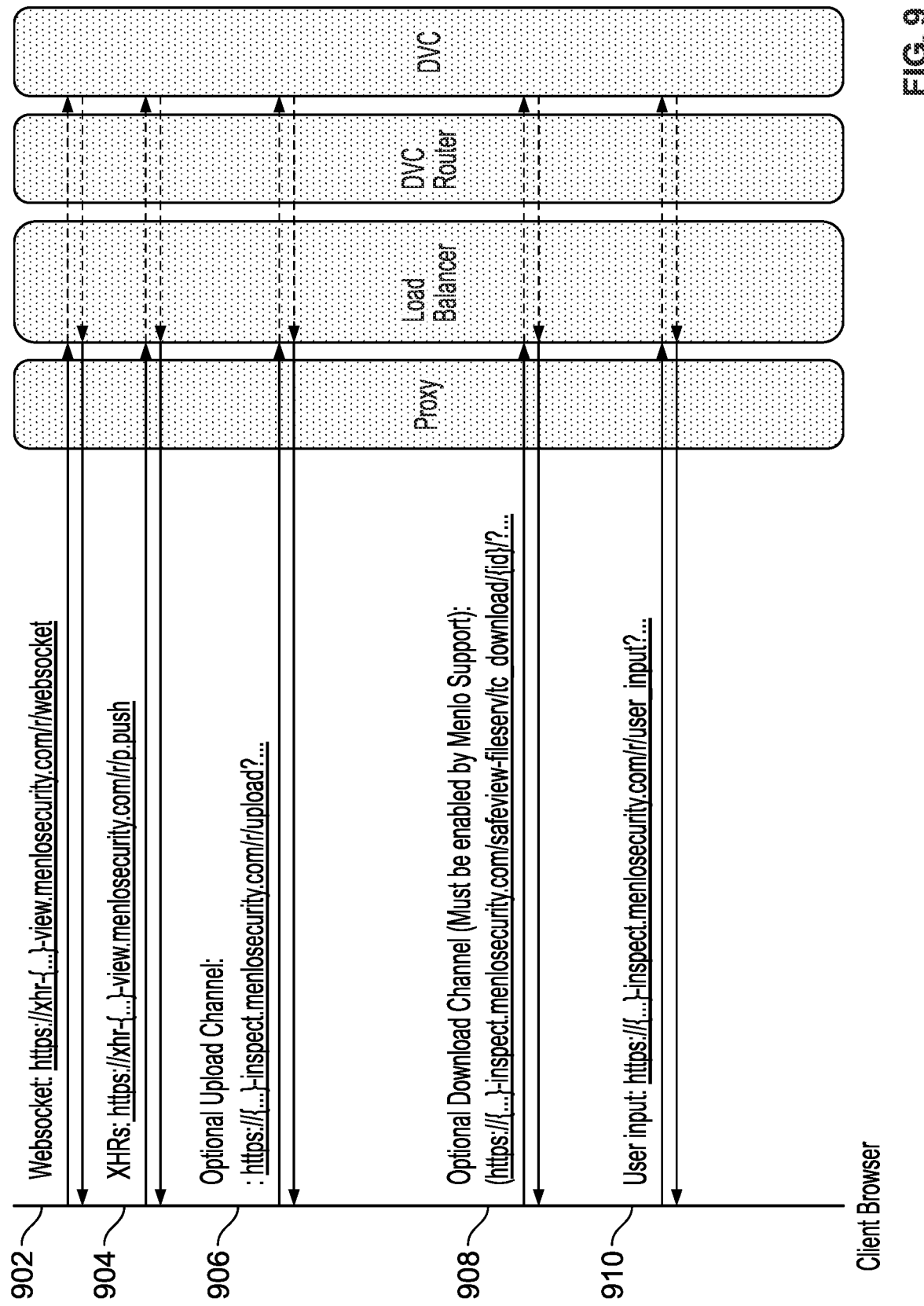
FIG. 9 illustrates different communication channels used in various embodiments.

FIG. 9 illustrates different communication channels used in various embodiments. Channel 902 is used to relay user input (mouse, keyboard) to the DVC. Channel 904 is used to relay rendering information to the client browser. As mentioned above, if possible, a WebSocket is used. Otherwise, XHRs are used. Channel 906 is a dedicated channel for uploads. The original destination URL (example.com) is a URL parameter (page url). Channel 908 is a dedicated channel for downloads. The original source of the file (example.com/file.bin) is a URL parameter (file_url) as well as in a response header (X-Msip-Download). Additional information is also present in the response headers: X-Msip-User has the user ID, X-Msip-Download-Source has the URL of the page from which the file is downloaded, and X-Msip-Download-Hash has the hash of the file content (SHA256). Finally, channel 910 is used to relay user input before being sent to the visited site. It uses a standard form POST to capture input to the page so far.

IV. HANDLING ENCRYPTED FILES

In the following discussion, suppose that Alice, an employee of ACME Bank, is using surrogate browsing system 702 at work, and that ACME Bank would like to prevent (e.g., via DLP) sensitive financial and other information from being exfiltrated from the bank (e.g., via bank computers). As a specific example, suppose ACME Bank would like to prevent credit card information from being exfiltrated (e.g., in files uploaded by users).

A. Configuring DLP

Figure 10:
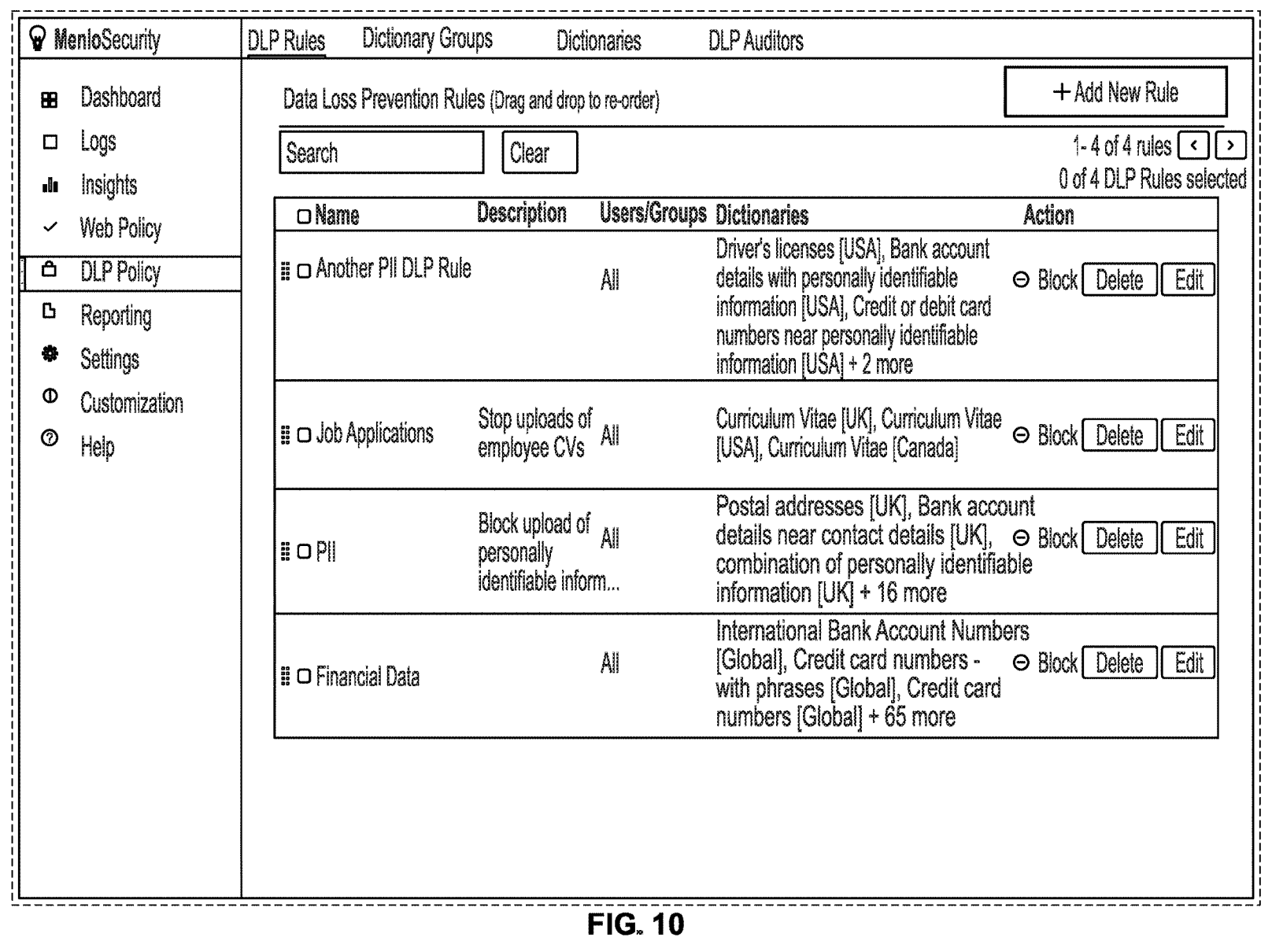
Figure 17:
FIG. 17 illustrates an example of an interface.

In order to configure a new DLP rule for credit cards, an ACME Bank administrator first accesses a tenant administration portal served by administration node 720. An example of that interface is shown in FIG. 10. The administrator clicks on "Add New Rule" and is presented with the interface shown in FIG. 11. The administrator names the rule and specifies an end-user notification message to display. Next, the administrator specifies that the rule applies to file uploads, as shown in FIG. 12. The administrator then specifies which users/groups of users should be subject to the rule, and for which sites the rule applies, as shown in FIG. 13. As shown in FIG. 14, the administrator can create a DLP auditor profile for alerting (e.g., via email) when the rule is violated, and specify contact information for those auditors. If desired, the auditors can receive a copy of the problematic file by selecting the appropriate option in the interface. The administrator can then attach the DLP auditor profile to the DLP rule and specify what action to take upon a rule violation, such as block, allow and log/alert, etc. (as shown in FIG. 15). The administrator next specifies which dictionaries should be used to look for rule violations (e.g., text containing credit card numbers in this example) as shown in FIG. 16. The dictionaries made available in interface 1600 can comprise both custom dictionaries (e.g., of words/phrases unique to ACME such as internal product names, internal IP addresses, etc.) and more generally applicable dictionaries (e.g., made available as part of a subscription service provided by system 702 and/or a third party, as applicable). Examples of dictionaries include compliance rules, rules pertaining to particular verticals (e.g., healthcare vs. finance), regionally applicable privacy rules, etc. Finally, the administrator saves the rule (the result of which is shown in FIG. 17). The finished rule is published by the administration node to other nodes as applicable (e.g., proxy node 706 and isolation node 708).

B. Triggering DLP

Suppose Alice creates a Microsoft Word document that contains a list of credit card numbers. She protects the document via a password, which encrypts the document using the ECMA-376 standard, rendering its content unreadable at the network/proxy level (e.g., to a typical proxy, firewall, or other network device). Other document types and encryption schemes can also be used in accordance with techniques described herein. After saving the document, Alice attempts to exfiltrate it by visiting a website to which it can be uploaded. In this example, the website is a DLP test website (dlptest.com). Other examples of sites that she could use include box.com, dropbox.com, onedrive.com, etc.

Figure 18:
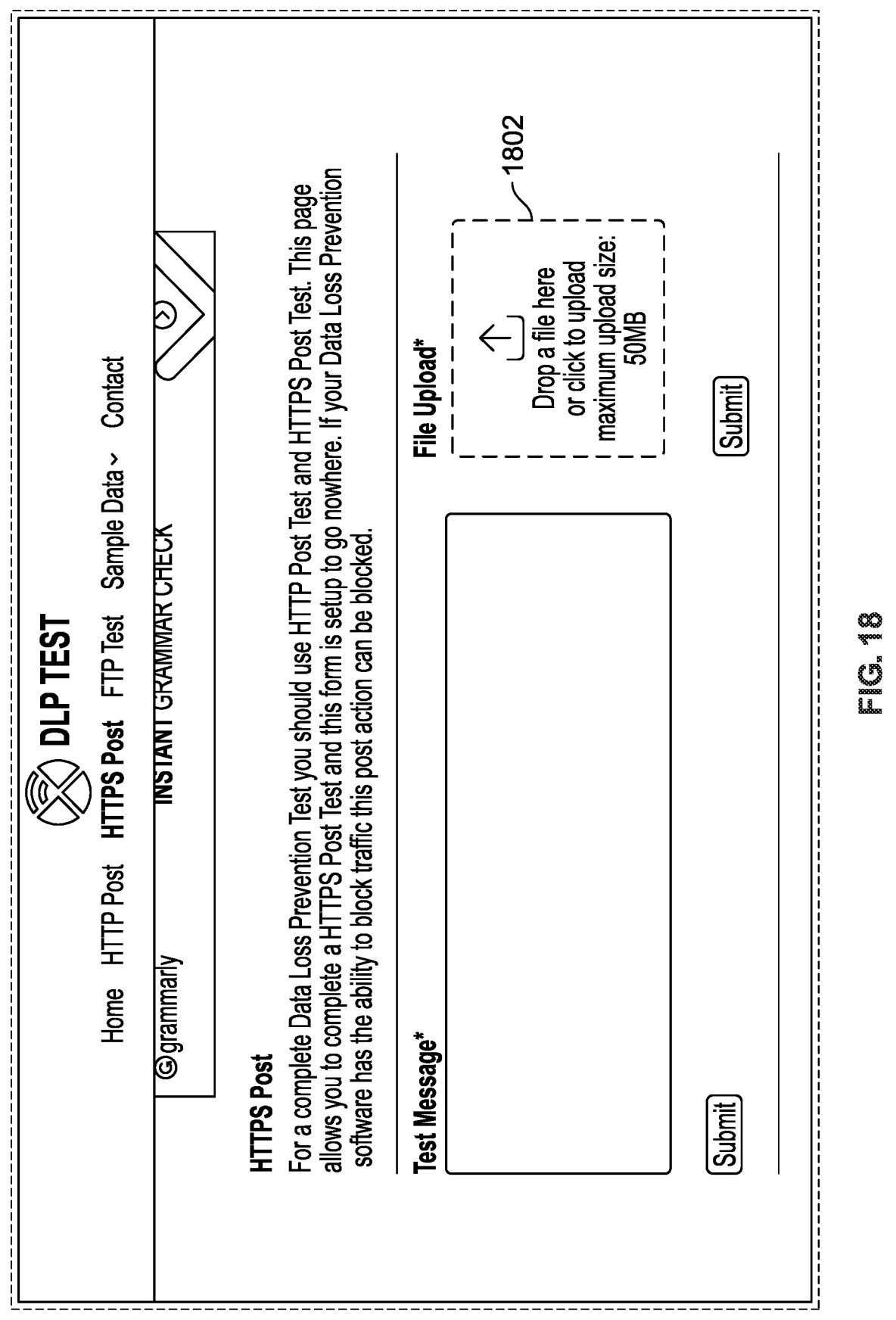

When Alice uses client 704 to access dlptest.com with her browser (via surrogate browsing system 702), the site is automatically isolated (e.g., in isolation container 738). An example of the upload interface of dlptest.com is shown in FIG. 18. When Alice clicks on region 1802, or drags the Word document to region 1802, surrogate browsing system 702 will identify that dlptest.com is requesting a file upload. It communicates (via the thin client) with her browser to initiate the file upload to isolation container 738 (via a standard POST). At this point, no portion of the file has been transmitted to dlptest.com. This prevents any complex/obfuscated protocols (e.g., employed by the remote website) from hiding the data, allowing for full inspection of the upload between client 704 and isolation container 738.

Figure 19:
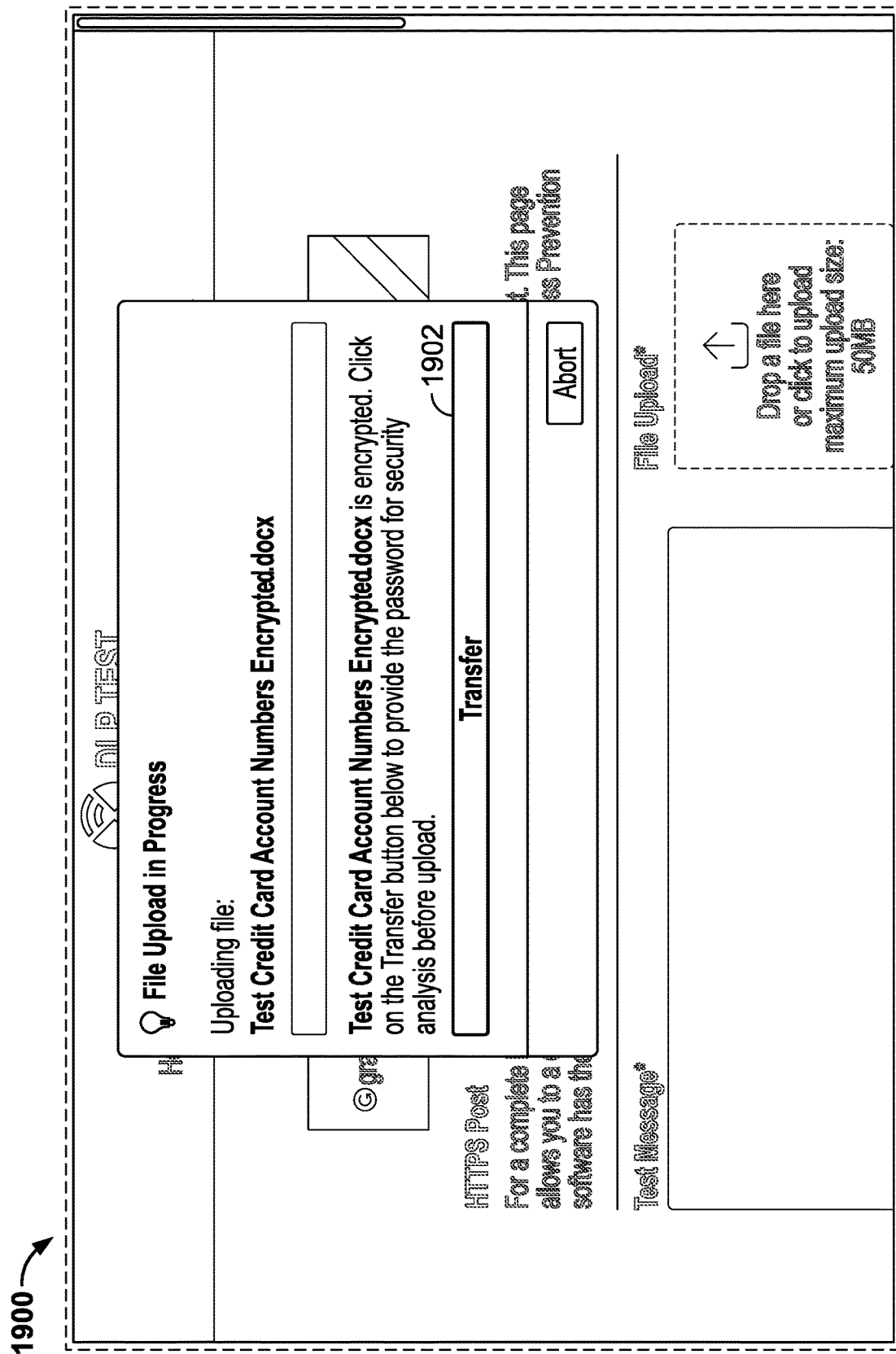
FIG. 19 illustrates an example of an interface.

When the file upload is completed from client 704 to isolation container 738, as described above, the isolation container will notify file server 748. File server 748 identifies that the uploaded file is an encrypted file. Because surrogate browsing system 702 controls the client browser and the response to the remote website, and also has the entire file, system 702 (e.g., via file server 748 which also includes web server functionality) is able to prompt Alice (via the thin client) for the password needed to decrypt the file. An example of such a prompt, rendered in an interface, is shown in FIG. 19. If Alice clicks on region 1902, she will be presented by surrogate browsing system 702 with a password submission interface such as is shown in FIG. 20. The interface can be customized by an administrator to include an applicable corporate logo, custom text, etc. (stored as static resources 732), to help Alice be confident that the password request is not a phishing attempt (e.g., by dlptest.com). Further, information such as the destination (e.g., dlptest.com) is shown in interface 2000 to help Alice confirm that the site to which she is attempting to upload the file is indeed the location she is intending to upload to.

If Alice is unable to supply a valid password (or clicks cancel) during the upload process, the file upload can be blocked (or allowed but with additional logging, notifications sent, etc., as applicable) as configurable by an administrator. Further, as applicable, system 702 can attempt to decrypt the file without Alice's password (e.g., where the file is protected with weak encryption and can be brute forced.) If the correct password is entered, the file is decrypted within isolation container 738 (or other appropriate location within surrogate browsing system 702, such as a temporary container used by system 702 while analyzing the file) and further content inspection can take place before the file starts to upload to the dlptest.com website. Examples of such content inspection include identifying malware present in the decrypted file, capturing the decrypted file and pushing it to a customer owned archive store and/or customer provided email address, examining the document for attempted data exfiltration, and pushing the document out via a REST API to a customer specified system (which can return back a modified version of the file, e.g., that has parts redacted, removed, modified, or watermarked which will replace Alice's original file during upload to the external website). Further, different rules can be applied in different contexts, e.g., allowing Alice to upload her document to an internal website based on policy, while preventing Alice from uploading the same document to an external website. In addition, in some cases, a given encrypted file may include within it additional encrypted files (e.g., an encrypted ZIP file containing another encrypted ZIP file, containing an encrypted document). As checks are performed by surrogate browsing system 702, Alice can be prompted to supply passwords for any additionally encountered encrypted files which can in turn be checked as well.

Figure 21:
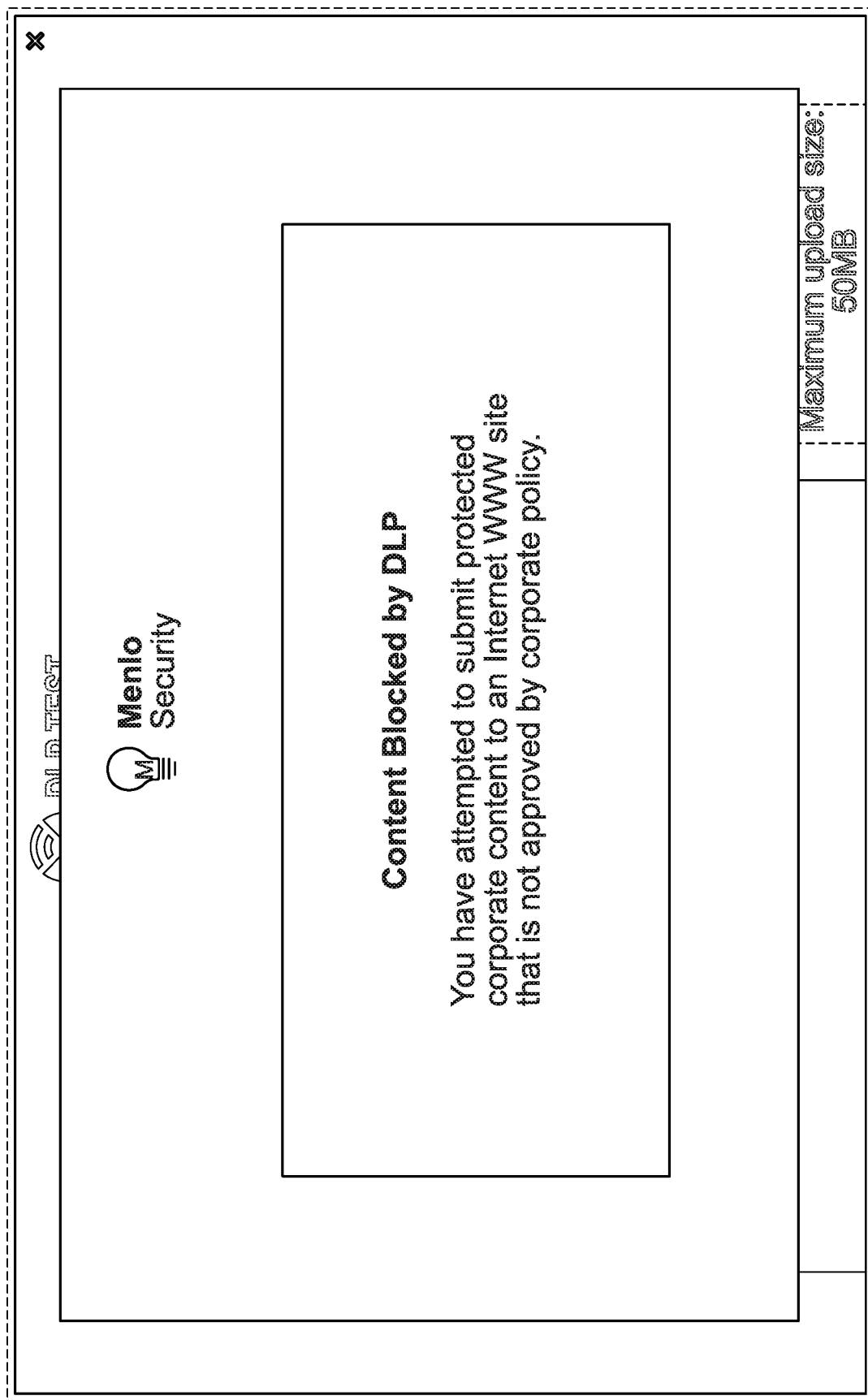
FIG. 21 illustrates an example of an interface.
Figure 22:
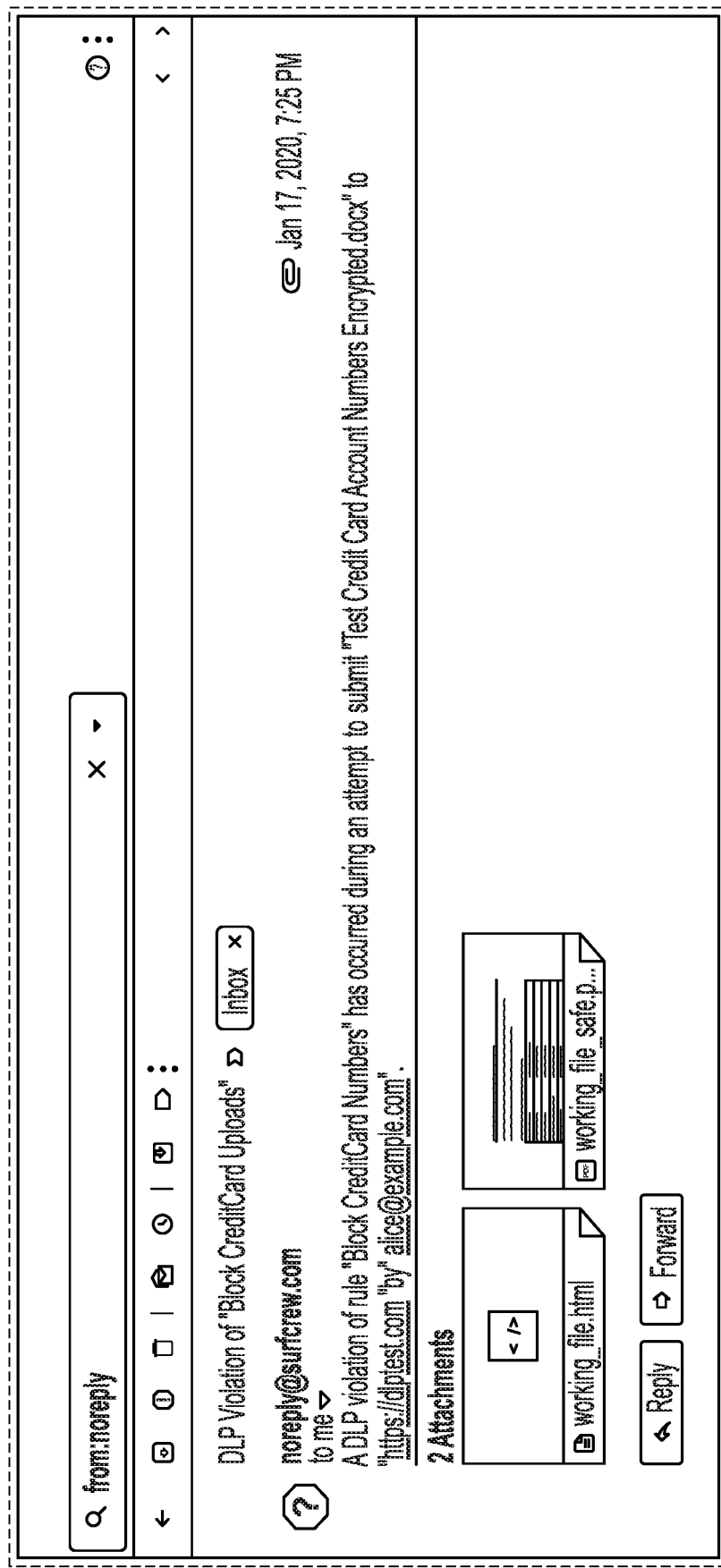
FIG. 22 illustrates an example of an email notification.

In the example shown in FIG. 21, Alice has provided the correct password for the document to surrogate browsing system 702. After decryption, surrogate browsing system 702 determines that contents of the file (i.e., credit card numbers) trigger the DLP rule shown in FIG. 17 and blocks the upload accordingly. In addition to notifying Alice that the file upload is blocked by policy, additional actions can also be taken as specified by the rule (e.g., logging, email notification, etc.). An example of a notification email that can be sent to auditors is shown in FIG. 22 and such notification can include attachments (e.g., including a (decrypted) copy of the file, a screenshot of the file, etc.) as applicable.

C. Example Workflow

Figure 23:
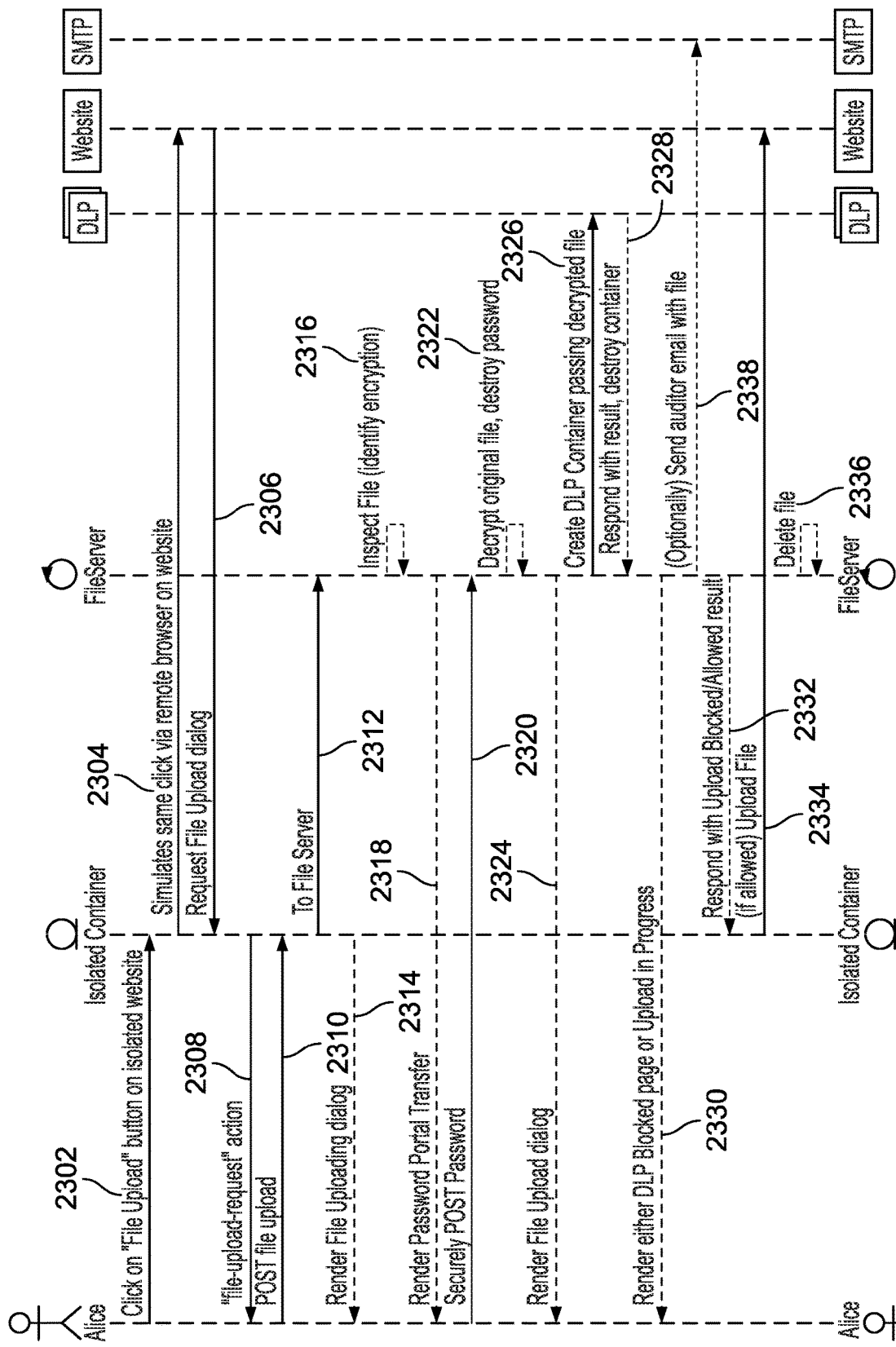
FIG. 23 is a flow diagram that illustrates a file upload.

FIG. 23 is a flow diagram that illustrates a file upload. First (2302) a user (e.g., Alice) clicks on a file upload button on an isolated website, which is intercepted by the isolated container. The isolated container simulates the same click to the remote web site (2304). The remote website responds with a request file upload dialog (2306), which is passed on by the isolated container to Alice's client (2308). Alice selects a file (e.g., using a file chooser), which results in her browser performing a POST file upload (2310) from her browser to the isolated container. Once the upload is complete, the isolated container informs the file server (2312) which inspects the file and identifies that it is encrypted (2316). The file server, as it is also a web server, provides a password submission portal to Alice's browser (2318). After entering a password, her browser performs a POST of the password to the file server (2320). The file server uses the password to decrypt the file (2322), creates a container for analyzing the decrypted file (2326), analyzes the decrypted file, and responds with analysis results (2328), while displaying a file upload dialog to Alice (2324). Based on results of the analysis, either an upload progress bar, or a block message (or another appropriate message) is shown to Alice (2330). Further, as applicable, an auditor email can be sent (2338). The analysis result (e.g., block or allow) is provided by the file server to the isolated container (2332). If the upload is allowed, the isolated container provides the file to the website (2334). When processing is complete, the file server deletes the file (2336).

Figure 24:
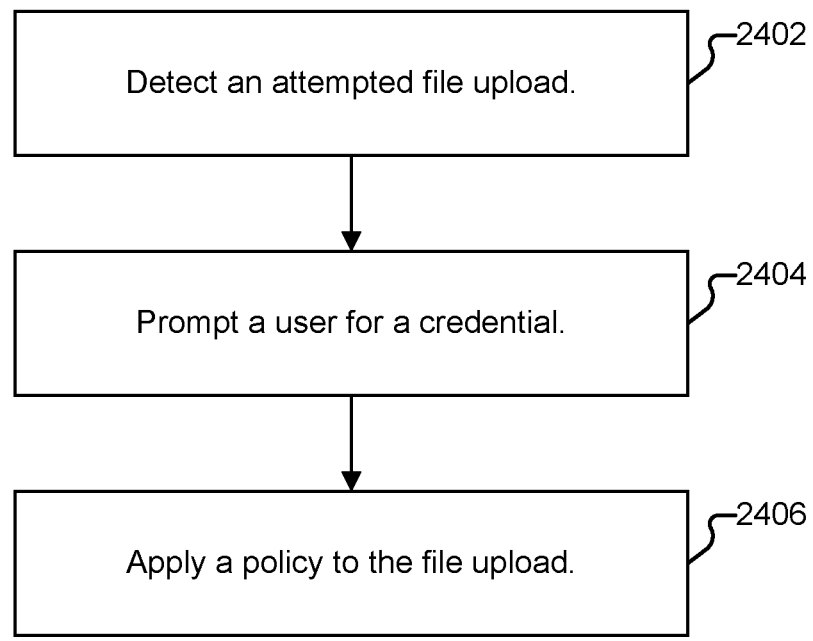
FIG. 24 illustrates an embodiment of a process for providing DLP to file uploads.

FIG. 24 illustrates an embodiment of a process for providing DLP to file uploads. In various embodiments, process 2400 is performed by surrogate browsing system 702. The process begins at 2402 when an attempted file upload is detected. An example of such file detection occurs when an isolation browser receives a request file upload dialog from a remote website (e.g., at 2306 in FIG. 23). At 2404, a user is prompted for a credential. An example of such prompting occurs when surrogate browsing system 702 provides Alice with interface 1900 shown in FIG. 19. Finally, at 2406, a policy is applied to the file upload. As one example, if the user provides a valid credential (e.g., that decrypts an encrypted file) and any applicable checks performed on the file succeed (e.g., no DLP or other violations are found), at 2406, the file is uploaded by surrogate browsing system 702 to the remote website. As another example, if the user fails to provide a credential, clicks cancel, etc., the file upload attempt can be terminated. As yet another example, if the user provides a credential, but the file is determined to violate one or more policies, appropriate actions can be taken, such as notifying an auditor, alerting the user that the file upload is blocked, etc.

V. TRANSPARENT WEB BROWSING RECORDER

A. Introduction

In various circumstances, it would be desirable to have a record of what took place when a user interacted with a remote website. As one example, if a user falls victim to a phishing website, it would be desirable to know what information, if any, the user provided to the website (e.g., a username, both a username and password, etc.) and/or what information was transferred to the user (e.g., a screenshot of the rendered website). One approach to capturing browsing-related data is to record network trace data (e.g., packet traces captured at an Internet gateway) and then attempt to reconstruct, based on the captured network traffic, what occurred. One drawback to this approach is that, particularly, with modern websites that include dynamic content such as Javascript content, captured network trace data provides a limited view of what happened during a given browsing session. A second approach, applicable to some modern browsers, is use of a browser-provided limited recording capability for web-page development purposes (e.g., DevTools). There are a number of drawbacks associated with this approach as well, described in more detail below.

In contrast to the above approaches, described herein are embodiments of an enterprise-scalable browser recording system that can capture users' web-page interactions across all types of browsers and all devices in the enterprise, and also capture resulting page state (e.g., screen shots, DOM/CSS tree, script state, and network requests/responses). The recording functionality described herein can be used for securely conducting transparent and reliable security forensics of very large user populations. The approaches described herein leverage Remote Browser Isolation (RBI) to offload recording activity to a remote Isolated Browser (IB) in a scalable manner without disrupting business processes or user workflows, avoiding degradation of the end-user experience, and supporting the secure recording of users' browsing activity without the need for end user intervention or consent. Further, RBI can be combined with a user activity triggered recording mechanism to focus collection on browsing activity most relevant to security forensics, thus reducing the overall volume of data collected and enabling administrators to conduct efficient analysis. In addition, policies governing what kinds of interactions are recorded can be implemented (e.g., for resource efficiency and to preserve user privacy).

Two example use case scenarios supported by the RBI browser recording techniques described herein are as follows. In a first example use case, a financial company wishes to capture up to three screenshots per minute, and capture all user input data whenever an employee of the company previously designated as a member of the "known phishing victim" user group inputs data into a browsing session. Other employees' sessions are not recorded. In a second example use case, a retail company wishes to capture all browsing session data and up to 20 screenshots per minute for any employee who inputs data into any websites classified as either "Uncategorized" or "Personal Web Hosting." In various embodiments, a surrogate browsing system, such as surrogate browsing system 702, variously leverages three main aspects of infrastructure to support web browser recording in these and other scenarios:

Transparent Interposition and Recording: The power of clientless Remote Browser Isolation (RBI) is leveraged to interpose on all user interactions with a page without disrupting the end user experience. Since administrators can deploy RBI to an entire organization automatically via a web proxy configuration update, users do not need to install additional software, change browsers, or alter their workflow in any way in order to participate in recording (i.e., it is transparent to users). Moreover, users need not be aware they are being recorded since all recording activity is automatically conducted on the Isolated Browser per admin policy. Administrators can initiate recording without user involvement.

High-Resolution Recording at Low Data Rates and Little Delay: Continuous, always-on recording of browser-level data such as screenshots and unencrypted HTTP requests could potentially generate huge volumes of data that would be expensive to collect (e.g., slowing user's browsing experience) and expensive/difficult to store, manage, and analyze. RBI can be leveraged to address these challenges. First, if always-on recording is desired, system 702 is able to do so with zero additional cost to the user's device by offloading the recording to the Isolated Browser. Second, as an alternative to always-on recording, system 702 provides a low data rate recording mode in which recording is performed only for short durations and triggered by interesting user activity, such as when the user types on the keyboard or moves the mouse.

Integration with policy: The parameters of recording, such as what to record, how often to record, and when to begin recording, will vary with the security use case. In various embodiments, such parameters are incorporated into policy module 746 so that administrators can specify applicable recording policies from a centralized location, e.g., on a per-site, per-user, and/or per-tenant basis.

B. Example Scenario: Phishing Site Fingerprinting

This section describes use of RBI-based browser recording for a hypothetical corporate customer named WidgetCorp, Inc. using various techniques described herein. WidgetCorp has over 20,000 employees, each with a desktop and mobile device. Corporate policy liberally allows for the use of any major browser (e.g., Internet Explorer, Safari, Chrome, Firefox, Edge, and Brave).

WidgetCorp suspects that its employees are the target of a phishing campaign initiated by a malicious actor. The actor fools WidgetCorp employees into thinking that a link is a legitimate sign-on page for various well-known services (e.g., Gmail, Office365, etc.). To evade detection, the malicious actor sends different phishing emails, with different links (e.g., varied domains), and visually different phishing pages to different employees. A traditional phishing detection module would not be able to catch all such page loads, e.g., because at least some of the phishing domains are potentially legitimate shared hosting sites (e.g., GDrive).

WidgetCorp administrators suspect that, although the phishing pages vary in appearance, the internal details of the pages are likely to be the same, or at least, similar. They would like to identify these internal similarities and craft a web-page fingerprint with which they can configure their firewall/proxy to detect and block future page loads that bear the same fingerprint. A fingerprint in this case may comprise malicious JavaScript snippets or HTTP requests made to command-and-control domains or IP addresses.

WidgetCorp transparently deploys Remote Browser Isolation (RBI) with Recording Capability (RBIRC) to all employee endpoints (desktop and mobile) via web proxy (e.g., by interacting with surrogate browsing system 702). Administrators configure the RBI system with a corporate-wide Browsing Recording policy (e.g., by interacting with a web-based dashboard interface provided by system 702). Once activated via the dashboard, the policy is propagated to policy enforcement and logging module 746 running on all isolation nodes 708 of system 702, ready to be queried by isolated browsers running in isolation containers 736 on those isolation nodes. For any web browsing session, the policy instructs the Isolated Browser to begin recording data when the employee starts typing into a form field and to stop five seconds afterward. The data items include inputs into form fields (via key presses or paste events), page screenshots, DOM & CSS state, JavaScript source code loaded by the page, and network requests in HTTP Archive (HAR) format. The policy also instructs the Isolated Browser to upload the collected data into a write-only bucket on AWS S3 (cloud storage).

Shortly after turning on the recording policy for all employees, Bob, an unsuspecting employee, receives an email with a phishing link. The email falsely claims that his Gmail account has been compromised, and that he must click on the link to change his password. The link points to a phishing web page (http://g00gle.com/) that loads script from malicious-actor.net, a domain controlled by the attacker and the destination to which credentials are exfiltrated:

```
<html>
<body>
Welcome to Gmail. We've detected suspicious activity in your account. Please change your account credentials.
<input id='login'>Login:</input>
<input id='password'>Password:</input>
<script src="http://malicious-actor.net/phishme.js"></script>
</body>
</html>
```

Bob clicks on the link as the email instructs, and his endpoint browser then loads the page through system 702. Rather than send the original page's content to Bob's browser, system 702 sends a thin client, which upon execution, requests the allocation of an isolated browser for Bob (if one has not already been allocated), and instructs that isolated browser to start loading the page (http://g00gle.com). The thin client then establishes a Web Socket channel with the isolated browser in order to get future updates from it and to send user input events to it. Upon page load, the isolated browser assigned to Bob queries recording policy from the policy module (e.g., module 746) co-located on the isolated browser's node. The query response indicates that recording is enabled for Bob and that recording should begin only when Bob begins typing into the page and stops five seconds afterwards. An example of JSON for an applicable policy looks like this:

```
{capture: true,
start_trigger: ['keypress', 'paste'],
stop_timeout: 5,
data: ['dom', 'source', 'network', 'keypress']}
```

The isolation browser sets variables in the Chromium Browser Process indicating that input events coming from Bob's endpoint browser should initiate recording, and that recording should stop five seconds after the last input event. The isolation browser resumes loading the page, generating rendering updates, and sending those updates over the Web Socket to the thin client running on Bob's endpoint browser. The thin client renders the updates coming from the isolated browser. The kind of updates generated depends on the rendering mode (e.g., DOM mode or Pixel mode). In this example, the page loads in DOM mode, where rendering updates comprise DOM tree mutations and associated resources. If the page had loaded in Pixel mode, then rendering updates would comprise Compositor Commits (Layer Lists, Property Trees, and Display Lists).

Bob now sees the phishing page on his endpoint browser. Bob, falsely convinced that the page is authentic, begins inputting his old and new credentials. The endpoint browser's thin client intercepts each input event and relays it to the isolated browser via the Web Socket channel. The Browser Process of the isolated browser receives the input and invokes the appropriate input handler on the Chromium Browser Process: the keypress handler for key presses, and paste handler for paste events. The input handler executes, at which point the isolated browser checks the policy variables that were set at page load. The variables indicate that recording is desired, so the isolated browser initiates recording, and sets a stop-recording timer for five seconds into the future. If recording has already been initiated due to a prior input event, it would continue recording and extend the timeout by five seconds. Upon initiating recording, the isolated browser does the following:

1. Allocates storage space and a directory on the isolated browser's file system to host recording data. An alternative implementation is to choose to save recording data in memory and write it to disk at the end of the recording session.
2. Turns on DevTools continuous network logging to a HAR file that resides in said directory.
3. Snapshots all DOM state and all loaded JavaScript source code and their origin URLs, again writing it to said directory. The DOM snapshot can be done by walking the page's DOM tree, either via the Chromium Extension APIs, or by injecting a JavaScript routine into each page. If the latter approach is taken, it is done in a way that does not disrupt the page execution or alert it to the fact that it is being run under isolation. As such, the injected script is run in a separate JavaScript execution context in some embodiments. A dump of JavaScript source code can be achieved by invoking DevTools APIs.
4. Allocates an "input.json" file to which inputs will be appended, again in said directory.
5. For each input event, the WidgetCorp recording policy indicates screenshots should be taken, thus the IB captures a screenshot after each input event. From a data collection and space perspective, this is cheaper than continuously taking screenshots at a periodic time interval. The isolated browser then forwards the input event to Blink, which is hosted on the Chromium Renderer Process. This data flow affords no opportunity for the malicious page's JavaScript to hide the input from the Recording module.
6. Upon DOM tree changes or changes to associated resources, the WidgetCorp recording policy also indicates that DOM snapshots should be taken. But, rather than dump the entire DOM after every mutation, the isolated browser records DOM mutations (i.e., deltas) made since the original DOM snapshot was taken when recording began. The isolated browser leverages Blink's Mutation Observers API to intercept DOM mutations. Critically, DOM state accounts for dynamic modifications to the page made by JavaScript, and looks like this:
<html>
<body>
Welcome to Gmail. We've detected suspicious activity in your account. Please change your account credentials.
<input id='login'>Login:</input>
<input id='password'>Password:</input>
<script src="http://malicious-actor.net/phishme.js"></script>
</body>
</html>
7. Upon loading of new JavaScript modules, DevTools will notify the Recorder module of all such script loads, at which point the script's code is recorded. Note that JavaScript may be loaded via inline <script>, via external <script>, or dynamically from encoded/binary content (e.g., blob-uri). Unlike network-level tracing tools, DevTools will provide notification for all such instances.

When the stop-recording timer fires due to five seconds of input inactivity, the isolated browser does the following:
1. Instructs DevTools to stop recording network activity, thus producing a final HAR file with all network activity of the recorded period.
2. Takes a final snapshot of the currently loaded page state (DOM state, CSS state, loaded JavaScript source code) and filenames.
3. Finalizes the "input.json" file, an example of which looks like this:

[{"keys": ['j', 'o', 'h', 'n', 'n', 'y'],
"type": ['keydown', 'keydown', 'keydown', ...]
"xpath": ["@id=login", . . . ]
"url": 'http://www.g00gle.com',
"timestamps": [0.9, 1.1, 1.3, 1.5, 1.6, 1.8]},
{"keys": ['1', '2', '3', '4', '5', '6'],
"type": ['keydown', 'keydown', 'keydown', . . . ]
"xpath": ["@id=password", . . . ]
"url": 'http://www.g00gle.com',
"timestamps": [4.9, 5.1, 5.3, 5.5, 5.6, 5.8]}]

4. Packages all content in the recording directory as a ZIP file and informs surrogate manager 740 that the recording is ready to be transferred into the S3 bucket indicated by policy. Surrogate Manager 740 then asynchronously and concurrently initiates the transfer.

Over the span of several weeks, WidgetCorp administrators observe that their once-empty S3 bucket now contains several recordings (they can also be alerted to such recordings automatically by system 702 or other appropriate mechanisms). They download the recordings onto a big data analysis platform (such as Spark/DataBricks), and, as part of their forensic work, initiate a feature clustering analysis to identify distinguishing features that could form the basis for a targeted website block policy (which can also be triggered as part of a workflow). Examples of features considered include the DOM state of the page, the domains that were contacted by the page, and source code executed by the page. That analysis yields the following results:

1. All pages that have the keywords "Gmail" and "account" in their DOM state fall into two distinct feature clusters, corresponding to legitimate and illegitimate (phishing) pages.
2. Feature cluster 1, the larger of the two, shows that requests were largely made to Google-controlled domains (*.google.com). By contrast, feature cluster 2 shows that inputted content was sent to non-Google controlled domains, most notably malicious-actor.net.
3. Feature clusters 1 and 2 also exhibit very different JavaScript fingerprints, with cluster 2 containing a very different set of functions than cluster 1. For instance, code loaded by cluster 2 includes a function with the name sb4s()—which is the minified name for send_to_comman_and_control_server()/.
4. An optional manual inspection of some pages in cluster 1 confirms that it corresponds to authentic Gmail sign-on pages, and those of cluster 2 correspond to Gmail look-alikes (phishing pages).
5. With the distinguishing characteristics at hand, a phishing fingerprint can be formulated that includes a combination of domain names and source code: e.g., makes request to malicious-actor.net and loads code with a function named sb4s().

The WidgetCorp administrators configure system 702 (or other appropriate system) to block all communications with the malicious domain and block loads of all scripts bearing that function name, if the page's DOM contains the keywords "Gmail" and "account." The next time any WidgetCorp employee clicks on a phishing link from the same malicious actor Bob encountered, he or she sees a block error message instead of the page contents: "This page is a phishing site and is now blocked by corporate policy." The fingerprints can be deployed at other customers, e.g., to automatically block similar attacks.

C. Example Process

Figure 25:
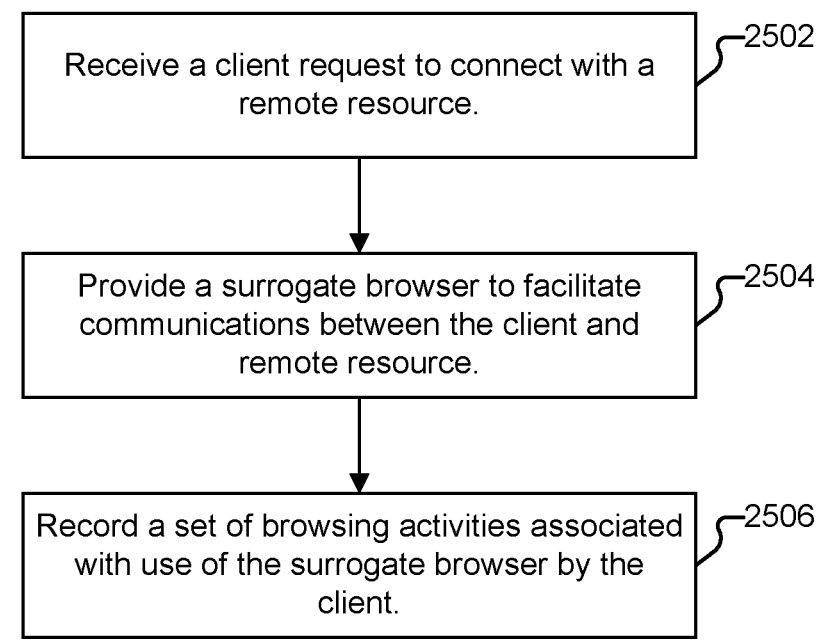
FIG. 25 illustrates an embodiment of a process for recording web browsing information.
Figure 29B:

FIG. 25 illustrates an embodiment of a process for recording web browsing information. In various embodiments, process 2500 is performed by system 702. The process begins at 2502 when a browser isolation system receives a request from a client browser executing on a client device to connect with a remote application. As one example, at 2502, Bob uses the web browser on his laptop to click on the phishing email instructing him to change his password in the above phishing scenario. At 2504, a surrogate browser is provided to facilitate communications between the client browser and the remote resource (e.g., as described variously above, such as in conjunction with FIG. 7). As explained above, system 702 determines that the browsing session between Bob and the remote resource (i.e., the page hosted at http://g00gle.com) should be recorded. Accordingly, at 2506, a recording is made of Bob's interactions with the remote resource (and stored, for example, for later forensic analysis, in an appropriate S3 bucket).

D. Additional Detail

1. Example Parameters

The following are examples of global parameters (settings) that administrators can use to manage various aspects of browser recording. The parameters can be exposed (e.g., via system 702) to administrators via a dashboard and stored in a database provided by system 702 and used by isolation nodes such as isolation node 708.

Capture on/off, and if on, whether started automatically or triggered by user input Screenshot capture on/off, and if on, how often (e.g., one every X seconds)

Site content capture on/off, and if on, which types:
metadata (HAR entries for objects requested by surrogate browser)
object content (include HTML, JS, CSS in HAR)

Capture user input on/off, and if on:
keypress data (on/off)
content state at navigation time (on/off)

Capture site Javascript activity (XHR and Web Socket communications, WebWorkers)
Metadata
Content (and max content size)
Storage parameters
S3 bucket and path
S3 credentials (keyID, secret key)

2. Policy Management

In various scenarios/environments, administrators may choose to configure the ability to opt-out of capturing browser session data for particulars categories (e.g., where sensitive personal information may be present). Examples of such categories include healthcare, finance, government, streaming media, and shopping. As illustrated in FIG. 26, in various embodiments, system 702 makes available an interface that allows an administrator to configure, on a per web page category basis, whether recording should be performed or not (e.g., by clicking a box in region 2602). Capture can also be performed based on threat type. As illustrated in FIG. 27, for example, recording can be turned on for uncategorized sites (by clicking box 2702) while leaving it off for other categories of threat (e.g., malware).

3. Recording Infrastructure

Returning to FIG. 7, in various embodiments, an isolation container such as isolation container 738 comprises isolated browsing and recording subsystems. The surrogate manager (740) is the only entity with the ability to access data in the isolation container in some embodiments, and hence is responsible for uploading data recorded by the isolated browser to third-party/external storage services such as Amazon S3. Policy enforcement and logging module 746 provides the surrogate manager and isolated browsers with responses to policy queries. The policy enforcement and logging module periodically pulls policy updates from a centralized policy and reporting service from which administrators configure policy for the entire organization (e.g., WidgetCorp).

Each isolated browser is housed in its own isolation container (e.g., 738), thus preventing isolated browsers from escaping and infecting other co-located isolated browsers. Due to containerization, data saved by one isolated browser is not visible to other isolated browsers. Only surrogate manager 740 may reach into an isolated browser's filesystem. The isolated browser itself can be any modern web browser (an example of which is the Chromium Web Browser).

a. Browsing Recorder Subsystem

As mentioned above, in various embodiments, a browsing recorder is incorporated into an isolated browser (e.g., in an isolation container 738). In an example implementation, the recorder is implemented as a C++ module that is statically compiled into the Chromium Browser process. The recorder interfaces with the Chromium APIs, and in particular the Chromium DevTools APIs, to take screenshots and record network traces.

Example features of the recorder include:

Ability to record full user interaction and code activity. Browser-level recording, unlike network-level recording, allows administrators to see exactly what the user sees and does on the page (e.g., user clicked on input field and typed her password), thus eliminating the labor-intensive decoding of potentially encrypted or obfuscated data flows and protocols that would normally be needed to understand user behavior at the network level. Particularly useful for forensics is the fact that the browser has full visibility into the DOM and CSS state, as well as the JavaScript source code (even if served obfuscated over the wire) being executed by a potentially malicious page, as well as the activity initiated by said page (e.g., command and control directives made via XHRs or image loads).

Reliable recording of malicious websites. Malicious sites (e.g., phishing sites) will actively thwart attempts at recording, for example, by attempting to intercept and suppress default input events before the browser is notified of it. Some may even try to detect the presence of recording agents injected into the page's JavaScript and disable malicious activity if found. To avoid these issues, the recorder interposes on input events at the point of injection into the Isolated Browser (before the page JavaScript event handlers fire), thus precluding suppression by page JavaScript. Moreover, no foreign JavaScript is injected into pages—interception is done at the Chromium Content Layer and/or via Isolated JavaScript worlds.

Completeness of user interaction data. Periodic snapshots of the webpage are useful, but they miss intermediate inputs to the page as might happen due to password autofill or inadvertent credential input. Our system is able to capture all intermediate user inputs sent to the page, in addition to the final state (e.g., showing a final state of a page before the user hit a "submit" button on a form submission page).

b. Captured Data

Upon visiting a new page, the Isolated Browser, subject to policy, records a variety of data. Examples of such data that can be captured include:
HTML, JavaScript, CSS, XHR requests:
URL, request+response headers, loading iframe URL
Response payload Request payload (for XHRs)
Web Socket in/out activity
User interactions
Keyboard/Paste input
    key pressed (or input for other entry methods, mainly IME)
    target iframe URL
    xpath to the target input field
    content of the input field after key press (40 byte window around cursor)
Mouse & touch activity
    Button presses and taps
    Position of presses and taps
Screenshots
A screenshot is taken after each key press
If there is a recent screenshot (e.g., <1 s), that screenshot is thrown out to be data efficient
At most x screenshots per minute are kept
In Pixel mode, the ability exists to record the sequence of commits sent to the thin client. This sequence can be replayed at a later time to provide a high resolution movie-like recording of web page activity and interaction.
Capture dynamically generated JS code
Serialize any JS parsed by V8 that didn't originate directly from a file. This helps in capturing obfuscated code.

In the Chromium browser, most of these data items can be captured via the Content layer APIs or via the DevTools APIs. Intercepting Compositor Commit sequences requires interposing on the browser's Compositor subsystem at the point where commits are generated.

A page visit is defined as a full navigation in some embodiments: HTML5 push state and anchor navigations do not constitute page visit boundaries. In an example Chromium-based isolated browser, for example, page visits are interposed by hooking the WebContents::DidCommitProvisionalPageLoad function.

c. Recording Method

Upon visiting a new page, the isolated browser's recording module does the following:

It consults policy enforcement and logging module 746 to determine the recording parameters for the site and user. Alternatively, fixed parameters may be used if policy support is not desired. The following example policy indicates that recording should be enabled upon 'keypress' and 'paste' events, and should remain enabled until five seconds after the last key press or paste event. The policy also indicates that DOM/CSS state, JavaScript source, and network requests should be collected:

{capture: true,
    start_trigger: ['keypress', 'paste'],
    stop_timeout: 5,
    data: ['dom', 'css', 'source', 'network', 'keypress']}

If recording is not enabled, continue with normal page load and skip the following steps. If recording is enabled, begin capturing the data specified by policy; if user activity is detected, enable recording of expensive data items such as screenshots per the parameters outlined by policy (see example above). Optionally, screenshots can blur out sensitive form fields on the page in order to keep personal info such as credit card numbers and SSNs private. Blurring of designated fields may be accomplished in a variety of ways. One approach to performing this blurring action is to OCR the screen and apply DLP or other rules that identify the structure of such information. Another approach is to temporarily apply a CSS blur filter on the target elements (e.g., all <input> elements) prior to taking the screenshot, and then remove the blur effect afterward.

Per the example policy given above, the user activity that would trigger recording includes keypresses and paste events. The isolated browser's DevTools recording capabilities are leveraged where applicable: e.g., to record network requests/responses, source code loaded, and DOM state. Screenshots are taken by invoking the Chromium content layer screenshotting API. To ensure efficient DOM state capture, a full checkpoint off the DOM is started from, and then subsequent mutations are logged to that checkpointed state. Mutations can be watched for via the standard Mutation Observers APIs.

When the thin client injects user inputs (e.g., key presses, taps, etc.), the recorder logs those events and invokes the Chromium screenshot capturing API prior to forwarding the events to the Renderer process (Blink). If dictated by policy, the recorder then disables logging of inputs directed at password fields, or records hashed values of the input fields after each change. The same applies to other sensitive fields. An example way of identifying a password field is as an HTML <input> element with a "password" attribute. Hashing is done with SHA-256 in an example embodiment.

If the recording threshold for a particular data class (e.g., network requests) has been reached, the recorder stops capturing items in that class, or captures only once there has been user input or if another window that has received user input has a handle for the window. To reduce data volume further, optionally, the recorder can stop logging request data if the user has been inactive for more than X minutes, and/or discard data for pages that were only visited for a short period of time, or did not receive user input.

When recording is complete or when the user navigates away, the isolated browser informs surrogate manager 740 to package (and optionally encrypt) the recording and upload to customer provided storage as indicated in policy. Alternatively, surrogate manager 740 can automatically detect the completion of recording and auto-initiate upload, or export every T minutes if there has been interesting activity such as keyboard input. Encryption is done via a customer-provided public key and storage can be in the cloud (e.g., AWS S3). Surrogate manager 740 uploads recordings concurrently with the isolated browser's execution to avoid introducing delays.

d. Lightweight Recording in Pixel Mode

In Pixel mode, in addition to the aforementioned recorded data items, a sequence of Compositor Commits is also recorded. Recordings can be rendered in an online or offline fashion using the Compositor Commit rendering code in the thin client (e.g., Remote Compositor client). The thin client can be augmented to conduct analysis during replay, or it can simply render the commits into a sequence of bitmaps (i.e., a movie) of the browsing session.

An example way the mechanism works is as follows. Upon generating a Compositor Commit, the isolated browser records the commit in an ordered list of commits. This list gets stored along with other recorded items, and is eventually serialized to external storage (e.g., S3 bucket). When playback or analysis of commits is desired, administrators download the recorded commits from the S3 bucket, and feed these commits into the thin client via its playback JavaScript API: e.g., ACR.playback (commits). An optional GUI can be provided to support such playback. An alternative option is to stream the commits to an analysis station where the commits are replayed and analyzed in real time, e.g., to aid in phishing detection. During playback, the user can specify an Analysis Canvas to which Commits are rendered. The Analysis Canvas implements a custom analysis or rendering function: e.g., raster a commit to a PNG file, or count the number of occurrences of the word "password," identify illicit images, identify leakage of sensitive corporate data, etc.

In comparison with screenshot-based recording, Compositor Commits have several desirable features. First, commits produce orders-of-magnitude more compact recordings because they describe page content in terms of scale-independent draw ops. Bitmap content referenced by the draw-ops is optional. The reduced storage requirements support continuous, always-on recording of sessions if desired. Second, commits incur low CPU recording overhead because serializing them does not involve compression or copying large volumes of data as may be the case with screenshots. Further, the draw-ops referenced by commits contain enough semantic information such as text, DOM element type, and hyperlink info to enable searching and indexing functionality: e.g., "find me the commit in which the user begins filling out a form field." The semantic information also supports higher-level semantic analysis such as machine vision or natural language understanding, which would in turn enable us to log and/or enforce policy based on higher-level policy goals: e.g., "flag pages/content that looks like other well-known content/pages as a possible phishing attempt."

4. Data Storage a. Data format

HTTP request data is captured, in various embodiments, in HTTP Archive (HAR) format. HTTP response payload is captured for documents, scripts, and stylesheet mime types. HAR files use a JSON-type format. They can be loaded in the network pane of Chrome DevTools via drag and drop. A variety of online HAR viewers exist (e.g., one made available by Jan Odvarko).

In some embodiments, the following additions are made to the HAR format. Each entry has a "_type" string field that indicates the type of the request as perceived by the surrogate (this may be distinct from the response type derived from the MIME type). This is one of: Document, Stylesheet, Image, Media, Font, Script, TextTrack, XHR, Fetch, EventSource, Web Socket, Manifest, Other. If a request fails due to an internal error (e.g., server certificate was invalid), the response has a "_error" string field with the reason (e.g., net:: ERR_CERT_AUTHORITY_INVALID)

The filename given to screenshots takes on the following format: screenshot_timestamp_{key counter}.jpg.

The filename of inputs is "input.info," and it is a JSON list. Each entry in that list has:
text—text for the event—if key, keytext, if paste, pasted content . . .
timestamp
type—one of 'keydown', 'paste', 'input'
xpath—info about the target field: tag name+class+id (if any)—format: xpath=unique_id.//INPUT [@class='myclass' and @id='myid']
field_text—content of the field, right after the input has been handled, if applicable, trimmed to a window of 40 bytes (30 bytes before offset, 10 bytes after)
offset—offset within the field, if applicable
iframe_url
input_counter The final field input state is stored as: state.info, a nested JSON dictionary where the first level key is a unique identifier+frame URL and the second level key is xpath.

b. Exporting the data from the Isolated Browser

After navigation (away from the page being recorded), the surrogate browser packages all the data above in one zip file. The zip file is made available to the surrogate manager running on the same node (e.g., surrogate manager 740) along with other information (e.g., user identifier, browser identifier, surrogate identifier, tab identifier, navigation counter, URL). The surrogate manager has sufficient permission to reach into the surrogate's container disk.

The surrogate manager uploads data to a user-defined storage area such as an S3 bucket. If S3 is used, an example filename format is:
user_name/
   {ts}_{bid}_{full_session_id}_{tab_id}_{nav_counter}_{url}.zip To upload files into the bucket, the surrogate manager needs write-only credentials to S3 bucket (alternatively, this could be made to work with a bucket without "list" privilege by adding a random string to each filename). If the surrogate manager cannot export the data, data is discarded (no retries will be attempted for that file—the surrogate manager operates as fire and forget, and the failure is logged).

c. Tenant config

The following is example S3 bucket connection information:
browsing_record_persistence:
{"enabled": true/false, //enforcement forcing this key to exist.
"mode": "s3", //"local" is supported for dev.
"bucket": "tenant selected name",
"path": "path within bucket",
"key_id": "xxx", "secret_key": "yyy"—if specified, AWS credentials }
browsing recorder:
{"enabled": true/false, //enable the feature as a whole
"screenshots": true/false, //whether to take screenshots.
"screenshot_cap": n, //only relevant if screenshots is true. If n==0, only nav time screenshot.
//If n>0, max number of screenshots per minute.
"xhrs": true/false, //capture XHR metadata, defaults to true
"xhr_payload": //true/false, capture XHR payload (both request+response)
"user input": true/false, //keyboard
"requests": true/false, //whether to capture metadata about network requests (except XHR).
"request_payload": true/false, //payload for html/css/js
"user input only": true/false, //discard captured content if no meaningful user input
"input_content": true/false', //input fields content at time of navigation
"max_payload_size": 10 M, //in bytes. Response body is truncated to this size
"max_post_size": 100 K, //in bytes. Request body is dropped if larger than this size }

5. Additional Interface Examples

Figure 28B:
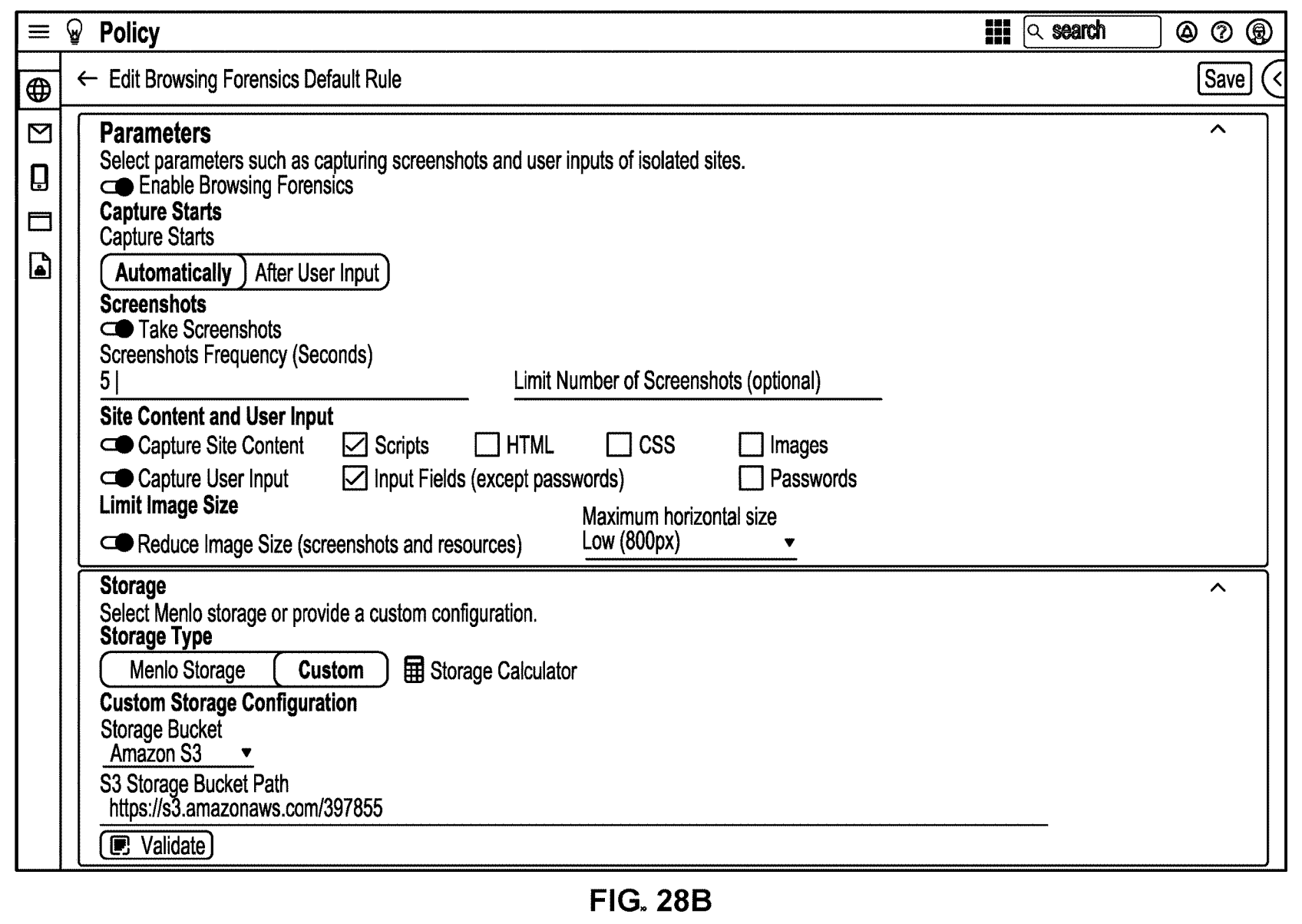
Figure 28D:
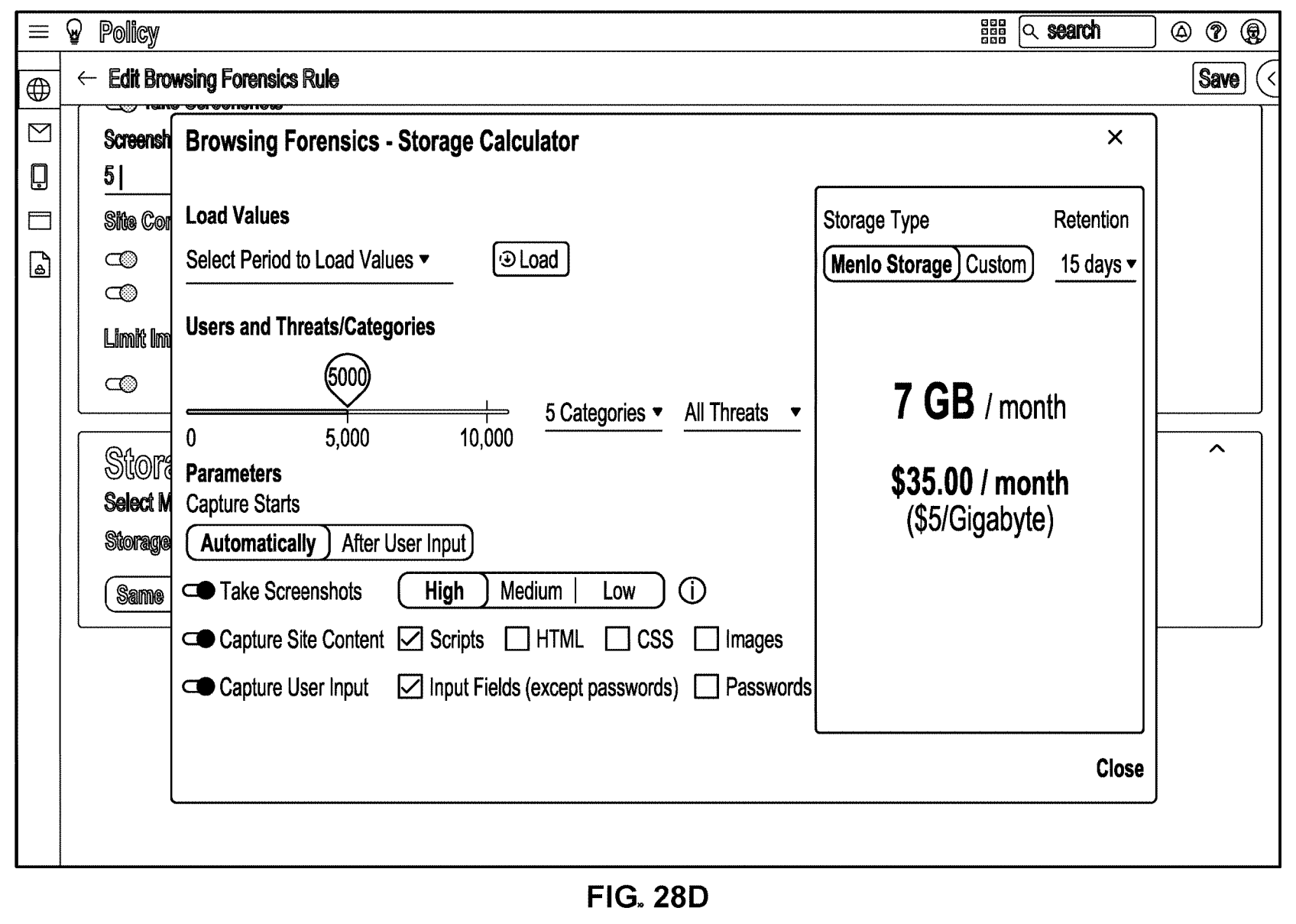

FIGS. 28A-28D and 29A-29D illustrate various interfaces for configuring browser recordings in accordance with techniques described herein. Information such as what should be captured, how frequently screenshots should be taken, where the captured information should be stored, etc., are configurable from the depicted interfaces, as well as any desired exceptions. FIG. 28D depicts a storage calculator that provides an estimated price and storage amount needed for a given period (e.g., 15-day retention). Factors that can be considered by the estimate include historical usage (e.g., usage during a previous period), the number of users covered by the recording policies and which enforcement parameters are configured, the amount/type of assets to be captured (e.g., screenshots, website content (e.g., scripts, HTML, CSS files, images, etc.)), user interaction and inputs, resolution/quality of any captured images, type of storage (e.g., Amazon S3 Standard vs. Amazon s3 Glacier), and retention length.

Figure 30B:
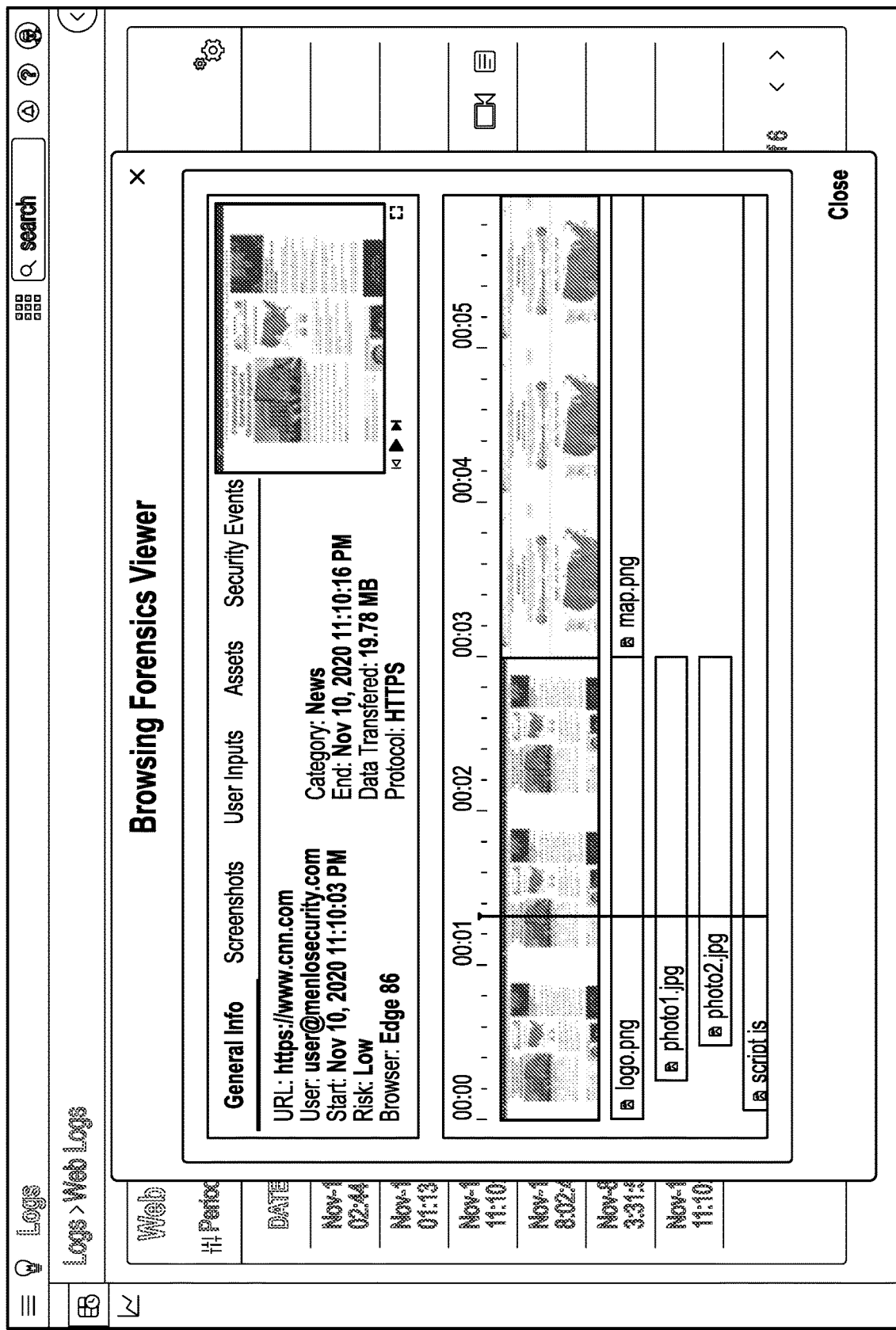
FIGS. 30B-30E illustrate examples of interfaces for reviewing a browser capture session.

FIG. 30A illustrates an example of an interface for reviewing a set of logs. By clicking on the camera icon depicted in region 3002, an administrator can review the browser recording using a browsing forensics viewer. FIGS. 30B-30H illustrate various interfaces provided by an example browsing forensics viewer. Using the browsing forensics viewer, the administrator can see a page as it appeared to the end user throughout the browsing session, as well as see user activity events, such as entry of text into a field.

FIG. 30B depicts general information about a browsing session as rendered in a browsing forensics viewer. The viewer provides visibility into the session and elements captured by depicting raw browser recorder data in a timeline. Examples of general information made available by the interface shown in FIG. 30B include URL address, user identifier, date and time of the session, categorization of the page visited, application layer protocol (e.g., HTTPS), a risk assessment of the page, and amount of data transferred. The interface shown in FIG. 30B provides the ability to view/ analyze the captured screen sequentially, and step through all interactions made during the browsing session. The timeline viewer provides the ability to navigate to specific points in the recorded session timeline and to compare activities/events (e.g., clicks and txt-inputs) with website resources loaded side-by-side.

Figure 30C:
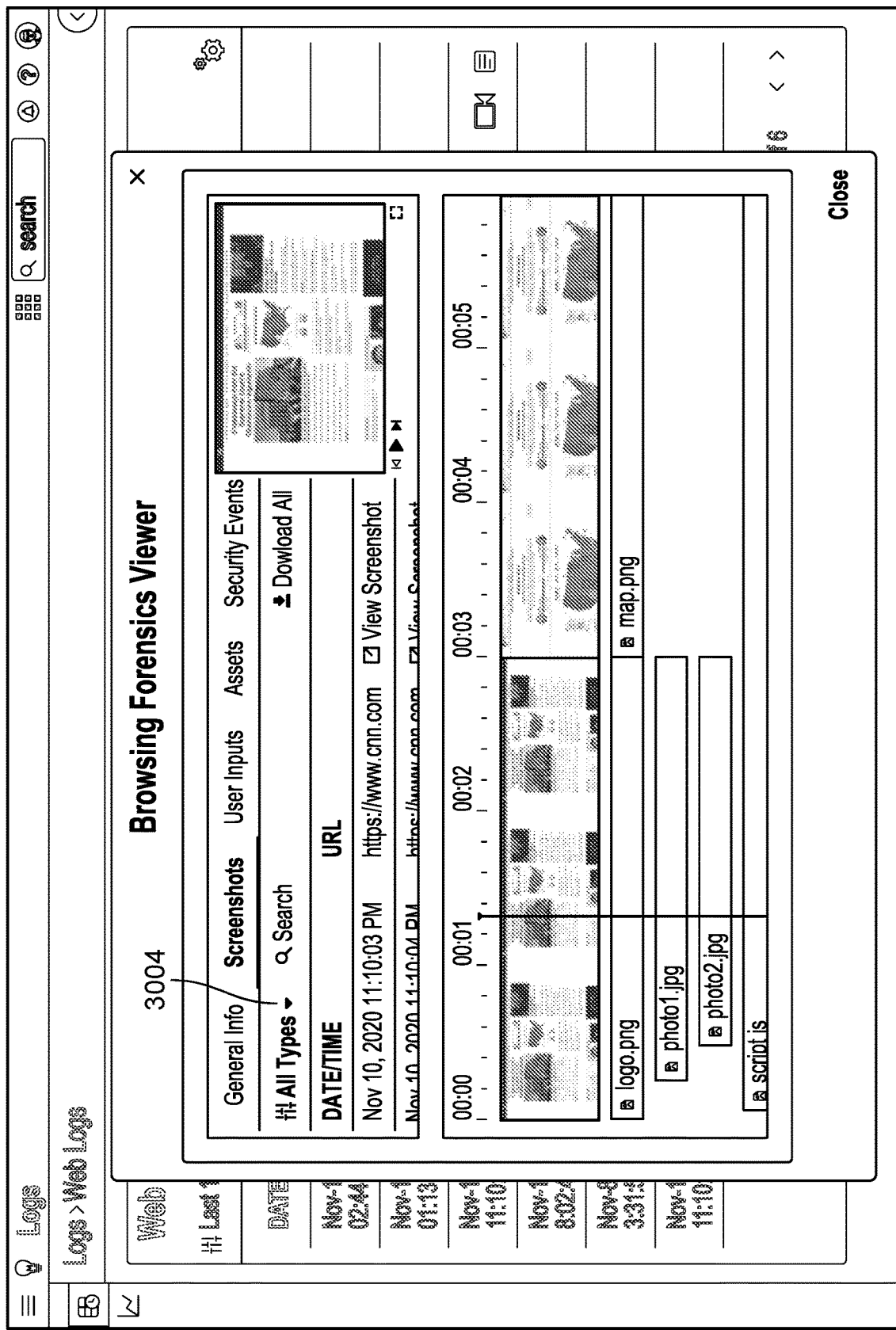

FIG. 30C depicts a screenshot viewer interface of an example browsing forensics viewer. It provides a list of all screenshots captured during the session. Screenshots can be downloaded, and filters applied to the list by interacting with region 3004 (e.g., to show only the screenshots associated with risky pages and/or security events). The screenshots can also be searched.

Figure 30D:
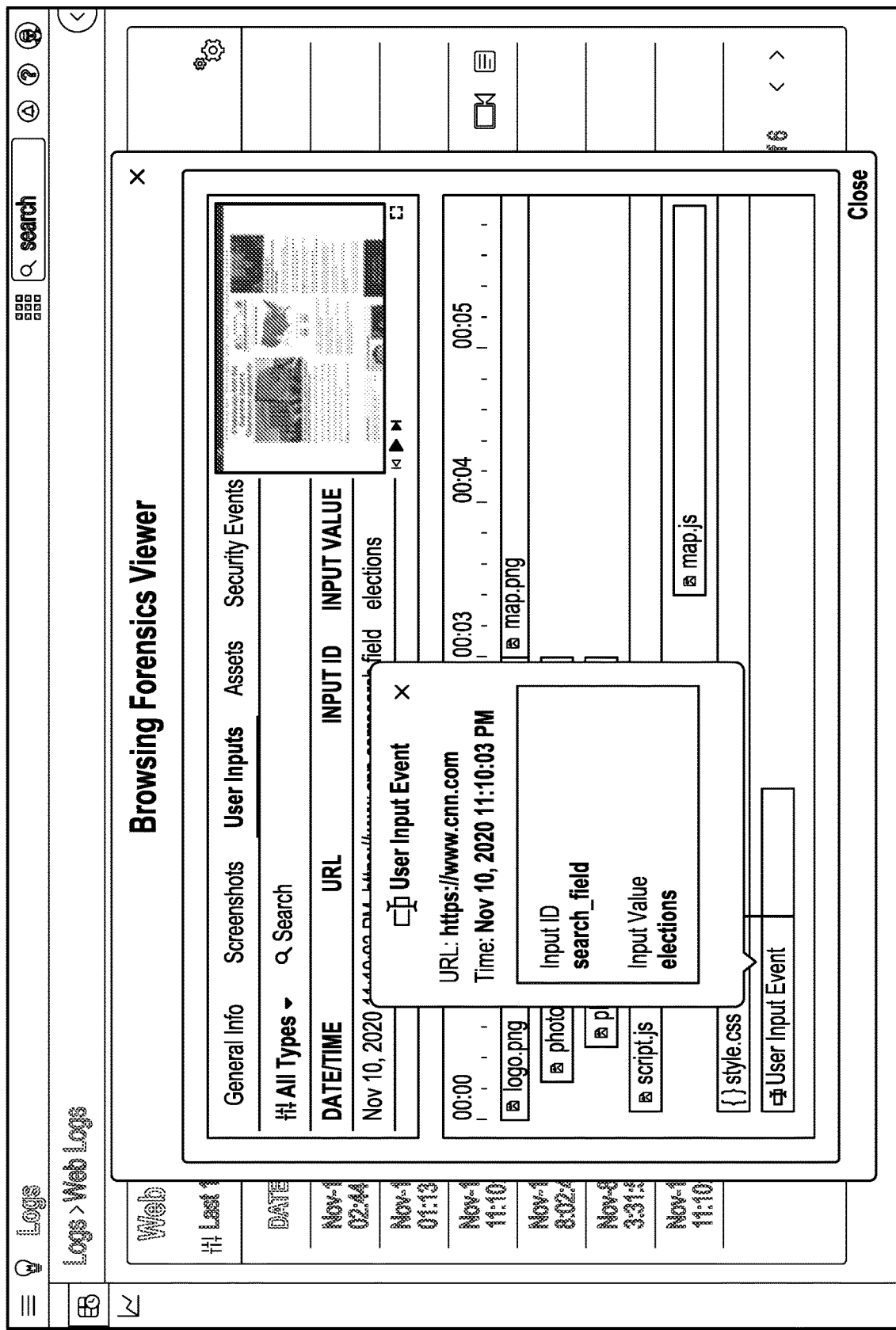

FIG. 30D depicts a user input viewer interface of an example browsing forensics viewer. It provides a list of input data events captured during the session, input identifier, and corresponding value (e.g., text, selected options from a list, true/false, etc.). In the example shown in in FIG. 30D, the user input was the user typing "elections" into a search box provided by www.cnn.com. As with screenshots, which user inputs are depicted can be filtered, and user input data can be searched. Events can be compared with screenshots and other website resources/assets, such as script files.

Figure 30E:
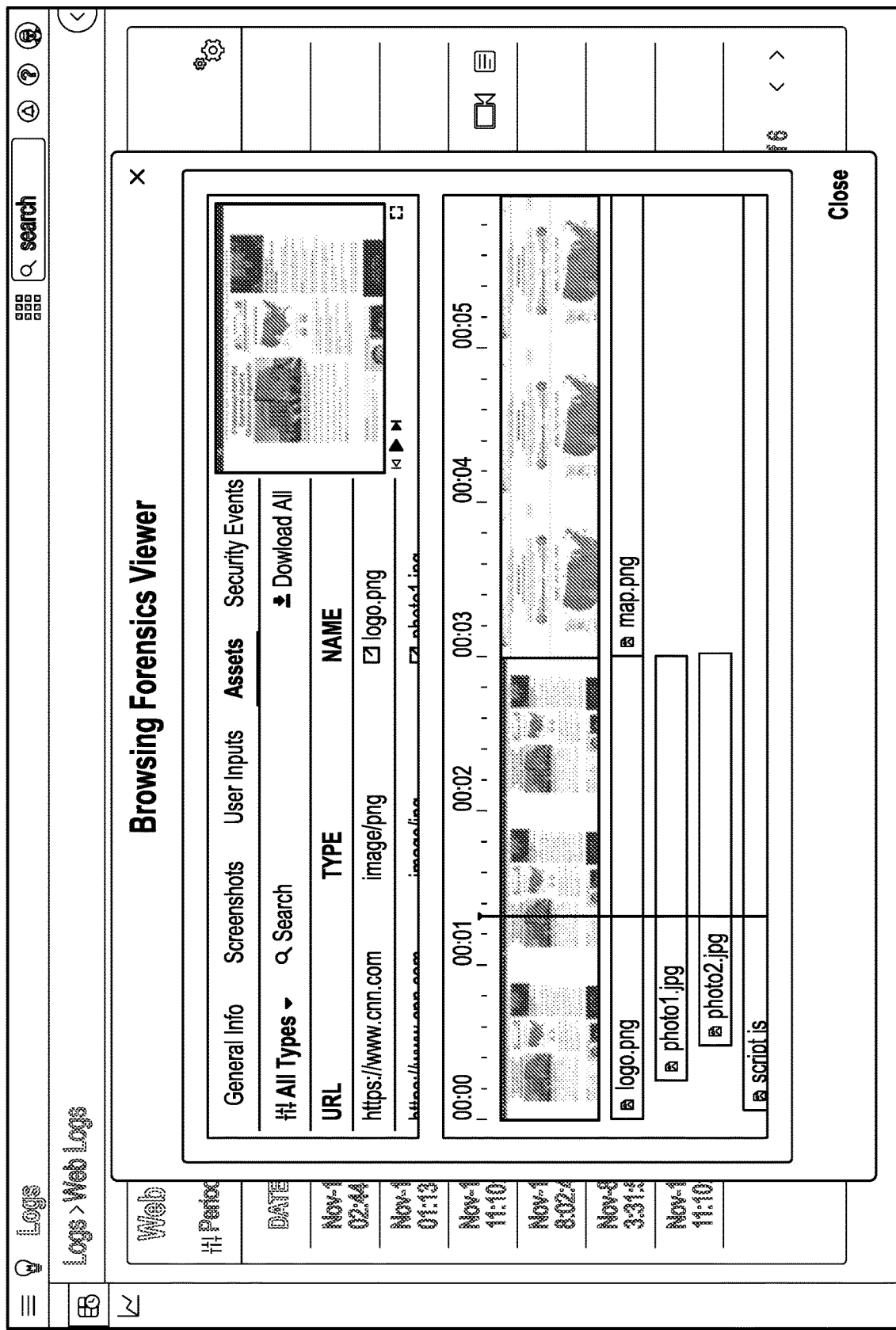

FIG. 30E depicts an asset viewer interface of an example browsing forensics viewer. It provides a list of all resources captured during the session. Which assets are shown in the interface can be filtered based on risk, and also based on other qualities (e.g., based on type such as image, script, or other filetype). Further, assets can be searched, opened, downloaded, and inspected individually.

Figure 30F:
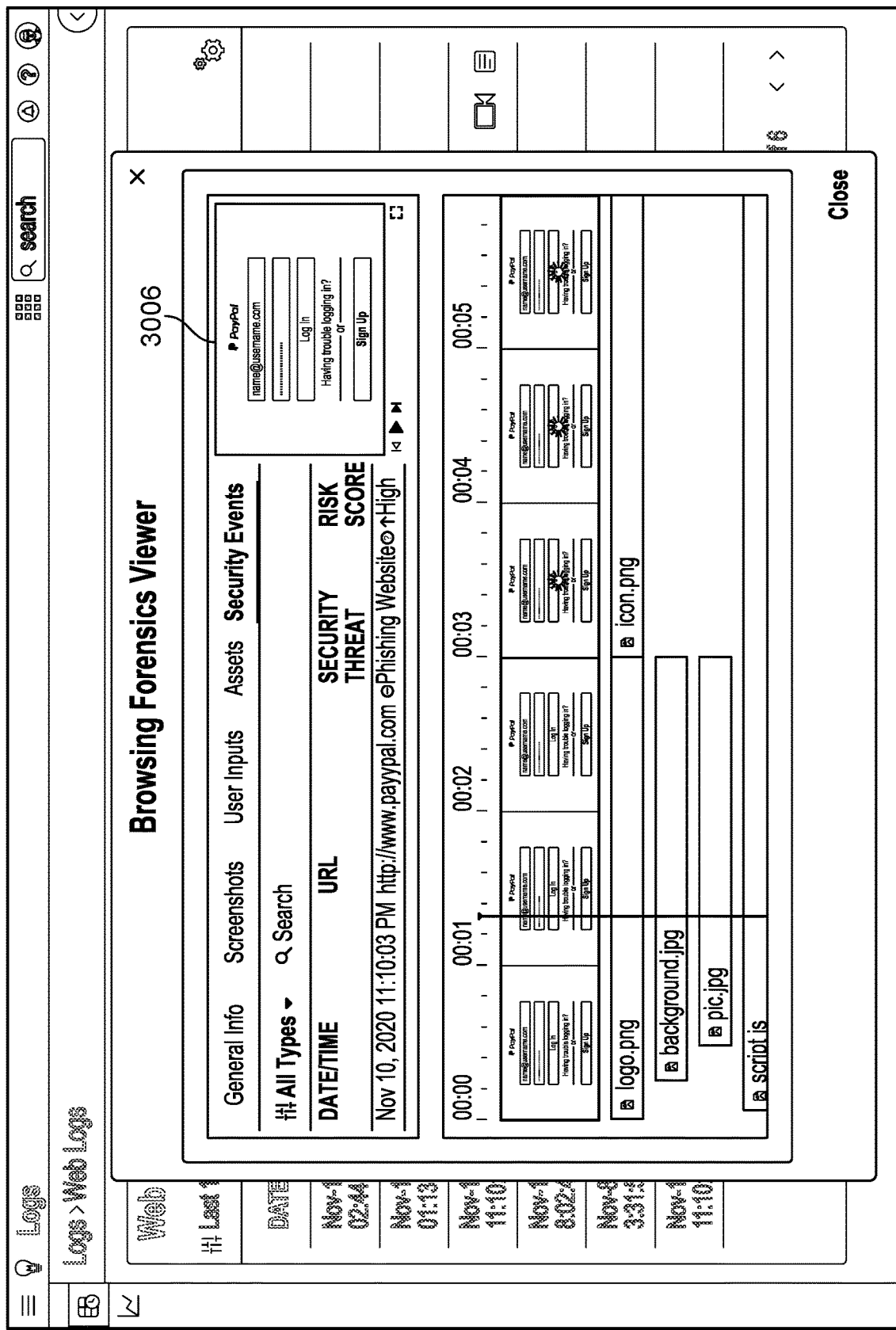
FIGS. 30F-30H illustrate an example investigation of a user having visited a phishing site.
Figure 30G:
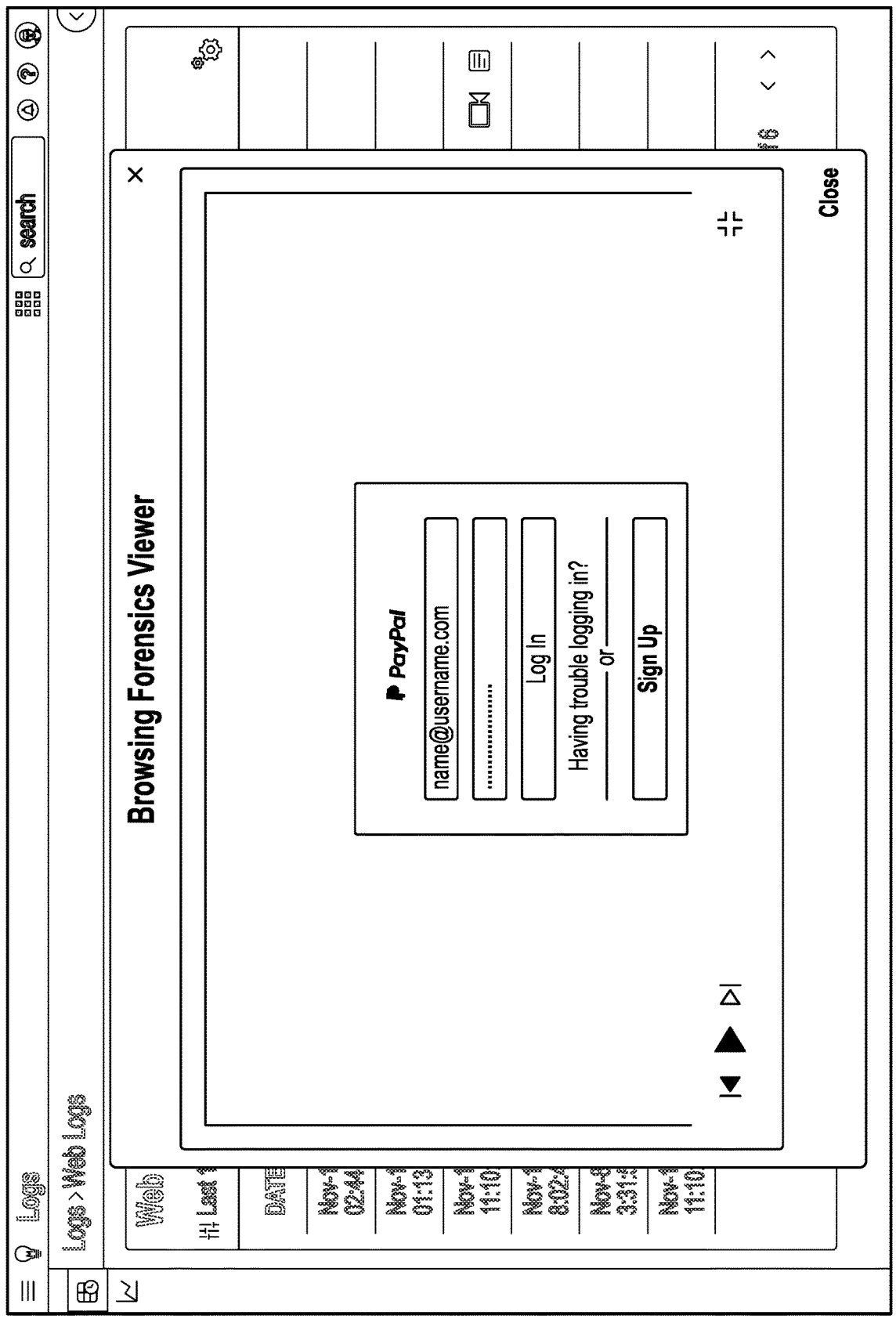
Figure 30H:
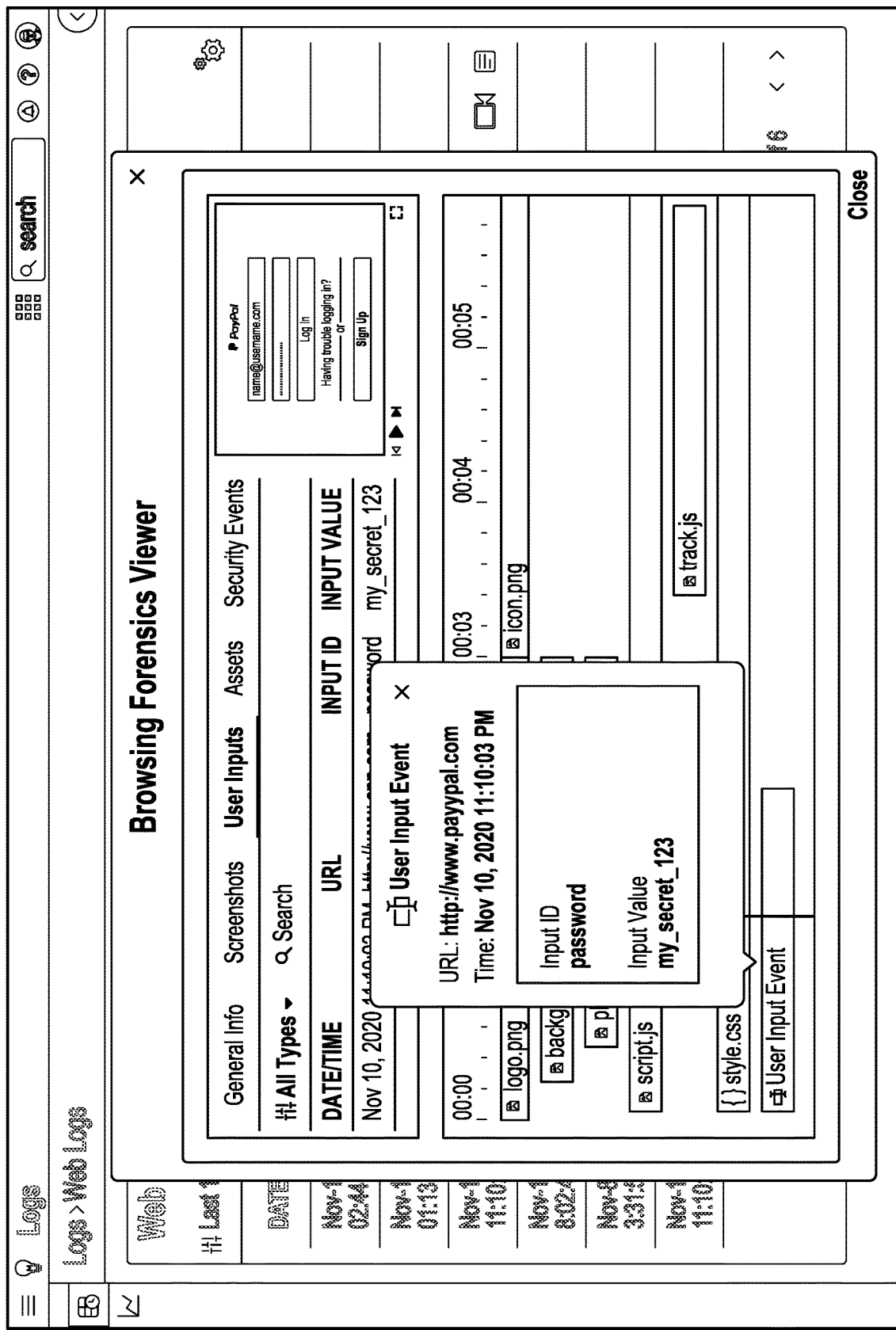

FIGS. 30F-30H illustrate an example investigation of a user having visited a phishing site (payypal.com) and entered their password. As illustrated in FIG. 30F, the security events interface of an example browsing forensics viewer indicates that the user visited a known phishing site, "www.payypal.com" during the session (and then typed a username and password into text boxes as shown in FIGS. 30G and 30H). The interface shown in FIG. 30F provides a list of all security events during a session, examples of which include: visiting a compromised website, accessing vulnerable services, taking risky actions, accessing malicious code, credential theft, phishing, etc. An administrator can use the interface shown in FIG. 30F to navigate to specific points in the recorded session timeline where the security event(s) occurred. For a given event included in the list of security events, a description of the type of threat (including the potential implications of the event), as well as an associated risk score are presented. The security events can be filtered and also searched, and individual events can be compared with screenshots and other website resources/ assets, such as script files. By interacting with region 3006 of the interface shown in FIG. 30F, the administrator can view a replay of the browsing activity (playback window depicted in FIG. 30G).

E. Comparison with Alternate (Non-RBI) Approaches

1. DevTools

Some modern browsers provide a set of developer tools built directly into the browser (e.g., Chrome DevTools). DevTools can support high-fidelity recording of network, JavaScript, and performance data as observed at the browser. DevTools are designed to aid in the development of specific web pages, however, rather than faithfully capturing user interaction with every visited website in a browsing session, and thus fall short at the task of transparently and reliably gathering browsing data—particularly across all usage of an organization's endpoint devices. In a DevTools recording approach, the user of an endpoint browser is required to explicitly initiate recording by opening DevTools and clicking a record button (for each and every tab or page interacted with). This incurs endpoint slowdown as well as workflow disruption, the latter because a typical end user is not a web developer and does not know how to operate DevTools. Further, even if the user does know how to operate DevTools, the user must be relied on to remember to turn on recording (or not maliciously fail to turn on recording), as well as perform tasks such as copying the recorded data to a designated storage location for potential later review by an administrator. Further, some mobile browsers (e.g., Google Chrome for Android) prevent the user from opening DevTools from the device itself, thus entirely precluding any browser recording on such endpoints.

In contrast, using RBI-based recording techniques described herein, recording is offloaded from the endpoint browser to the isolated browser, where it can be performed without impacting the end-user experience. Once configured by an administrator, system 702 automatically provides for recording of browsing sessions (across all types of browsers/ client devices), with no user or administrator intervention required. RBI can be combined with intelligent recording where the system detects user-activity such as key presses in order to reduce the amount of data that is collected. Recording can be automatically initiated upon detecting user-input activity (precluding the need for user involvement or consent) and disabled when the user becomes idle.

2. Network Packet Capture

As mentioned above, an alternate way of attempting to gain visibility into a browsing session is through use of network packet capture. Unfortunately, reconstructing the user's browsing activity from low-level TCP flow information is labor intensive and error prone at best, and impossible in the worst case. In particular, network-level recording tools have no visibility into how the user interacts with the page in terms of what the user sees (the final rendered output) and what the user inputs into the page, nor do they have access to encrypted data (unless SSL bumping is already used by the organization).

In contrast, using RBI-based recording techniques described herein, a variety of semantically rich data can be recorded at the (isolated) browser level (e.g., DOM/

JavaScript state, unencrypted HTTP requests/responses, source code being executed, etc.), providing a level of visibility that far exceeds what would be made available using network traffic recording tools. Unlike network packet capture reconstruction, a recording of the Isolated Browser allows security teams to easily see what the user saw (e.g., screenshots) and inputted into the page (e.g., keystrokes), prior to it being encoded by the application, encrypted by the SSL layer, and sent on the wire as an IP packet. No laborious or error-prone reconstruction is required.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a processor configured to:
        receive, at a browser isolation system that is remote from a client browser executing on a client device operated by a user, a request from the client browser executing on the client device to connect with a website;
        provide, by the browser isolation system, a surrogate browser to facilitate communications between the client browser and the website;
        determine that the website is not exempt from browser activity recording;
        determine that a triggering even has occurred, based at least in part on:
            receiving, by the browser isolation system, an indication that an attempt is made by the user to interact with content on the website, including by entering text into a field; and
            applying a browser recording policy to a context associated with a browsing session of the client browser;
        in response to the determination that the triggering event has occurred, further determine:
            (1) that a set of browsing activities associated with use of the client browser to communicate with the website using the surrogate browser should be recorded, and
            (2) a set of parameters applicable to recording the set of browsing activities associated with the use of the surrogate browser by the client browser,
        wherein the determining, based at least in part on receiving the indication and applying the browser recording policy to the context includes determining at least one of:
            (1) an identification of the user, or
            (2) an identification of the website, and
        wherein applying the browser recording policy is based at least in part on at least one of:
            (1) the identification of the user or
            (2) the identification of the website; and
        record the set of browsing activities associated with use of the surrogate browser by the client browser; and
    a memory coupled to the processor and configured to provide the processor with instructions.

2. The system of claim 1, wherein the set of recorded browsing activities comprises a set of user activities.

3. The system of claim 1, wherein the set of recorded browsing activities comprises a set of network activities.

4. The system of claim 1, wherein the set of recorded browsing activities comprises a set of browsing session screenshots.

5. The system of claim 4, wherein at least one screenshot included in the set of browsing session screenshots is taken in response to receipt of a user interaction.

6. The system of claim 5, wherein the user interaction comprises a keyboard interaction.

7. The system of claim 5, wherein the user interaction comprises a form submission.

8. The system of claim 5, wherein the user interaction comprises a mouse interaction.

9. The system of claim 4, wherein capturing a screenshot included in the set of browsing session screenshots includes selectively blurring sensitive information so that a subsequent reviewer of the screenshot is not exposed to confidential information of the user.

10. The system of claim 1, wherein determining that the website is not exempt from the browser activity recording includes determining a categorization of the website.

11. The system of claim 10, wherein determining the categorization includes determining that use of the website is potentially malicious.

12. The system of claim 1, wherein applying the browsing recording policy includes deleting the set of recorded browsing activities in response to a determination that malicious activity did not occur during the communications between the client browser and the website.

13. The system of claim 1, wherein applying the browser recording policy includes deleting the set of recorded browsing activities in response to a determination that one or more user interactions did not occur during the communications between the client browser and the website.

14. The system of claim 1, wherein the recording is stored into a third-party data store using a write-only permission so that the browser isolation system cannot subsequently access the recording.

15. The system of claim 1, wherein recording the set of browsing activities includes identifying a sensitive field and not recording a text value input into the sensitive field.

16. The system of claim 1, wherein recording the set of browsing activities includes identifying a sensitive field and recording a hash of a value input into the sensitive field.

17. The system of claim 1, wherein the set of recorded browsing activities includes a final browser state prior to closure of the connection with the website, wherein the final browser state includes a DOM tree.

18. The system of claim 1, wherein the processor is further configured to provide an interactive interface for viewing the recorded set of browsing activities.

19. A method, comprising:
    receiving, at a browser isolation system that is remote from a client browser executing on a client device operated by a user, a request from the client browser executing on the client device to connect with a website;
    providing, by the browser isolation system, a surrogate browser to facilitate communications between the client browser and the website;
    determining that the website is not exempt from browser activity recording;
    determining that a triggering event has occurred, based at least in part on:
        receiving, by the browser isolation system, an indication that an attempt is made by the user to interact with content on the website, including by entering text into a field; and applying a browser recording policy to a context associated with a browsing session of the client browser;
in response to the determination that the triggering event has occurred, further determinining:
(1) that a set of browsing activities associated with use of the client browser to communicate with the website using the surrogate browser should be recorded, and
(2) a set of parameters applicable to recording the set of browsing activities associated with the use of the surrogate browser by the client browser, wherein the determining, based at least in part on receiving the indication and applying the browser recording policy to the context includes determining at least one of:
(1) an identification of the user, or
(2) an identification of the website, and
wherein applying the browser recording policy is based at least in part on at least one of:
(1) the identification of the user or
(2) the identification of the website; and
recording the set of browsing activities associated with use of the surrogate browser by the client browser.

20. A computer program product embodied in a non-transitory computer readable medium and comprising computer instructions for:
receiving, at a browser isolation system that is remote from a client browser executing on a client device operated by a user, a request from the client browser executing on the client device to connect with a website;
providing, by the browser isolation system, a surrogate browser to facilitate communications between the client browser and the website;
determining that the website is not exempt from browser activity recording;
determining that a triggering event has occurred, based at least in part on:
receiving, by the browser isolation system, an indication that an attempt is made by the user to interact with content on the website, including by entering text into a field; and
applying a browser recording policy to a context associated with a browsing session of the client browser;
in response to the determination that the triggering event has occurred, further determining:
(1) that a set of browsing activities associated with use of the client browser to communicate with the website using the surrogate browser should be recorded, and
(2) a set of parameters applicable to recording the set of browsing activities associated with the use of the surrogate browser by the client browser,
wherein the determining, based at least in part on receiving the indication and applying the browser recording policy to the context includes determining at least one of:
(1) an identification of a user or
(2) an identification of the website, and
wherein applying the browser recording policy is based at least in part on at least one of:
(1) the identification of the user or
(2) the identification of the website; and
recording the set of browsing activities associated with use of the surrogate browser by the client browser.

21. The method of claim 19, wherein the set of recorded browsing activities comprises a set of user activities.

22. The method of claim 19, wherein the set of recorded browsing activities comprises a set of network activities.

23. The method of claim 19, wherein the set of recorded browsing activities comprises a set of browsing session screenshots.

24. The method of claim 23, wherein at least one screenshot included in the set of browsing session screenshots is taken in response to receipt of a user interaction.

25. The method of claim 24, wherein the user interaction comprises a keyboard interaction.

26. The method of claim 24, wherein the user interaction comprises a form submission.

27. The method of claim 23, wherein the user interaction comprises a mouse interaction.

28. The method of claim 23, wherein capturing a screenshot included in the set of browsing session screenshots includes selectively blurring sensitive information so that a subsequent reviewer of the screenshot is not exposed to confidential information of the user.

29. The method of claim 19, wherein determining that the website is not exempt from the browser activity recording includes determining a categorization of the website.

30. The method of claim 29, wherein determining the categorization includes determining that use of the website is potentially malicious.

31. The method of claim 19, wherein applying the browsing recording policy includes deleting the set of recorded browsing activities in response to a determination that malicious activity did not occur during the communications between the client browser and the website.

32. The method of claim 19, wherein applying the browser recording policy includes deleting the set of recorded browsing activities in response to a determination that one or more user interactions did not occur during the communications between the client browser and the website.

33. The method of claim 19, wherein the recording is stored into a third-party data store using a write-only permission so that the browser isolation system cannot subsequently access the recording.

34. The method of claim 19, wherein recording the set of browsing activities includes identifying a sensitive field and not recording a text value input into the sensitive field.

35. The method of claim 19, wherein recording the set of browsing activities includes identifying a sensitive field and recording a hash of a value input into the sensitive field.

36. The method of claim 19, wherein the set of recorded browsing activities includes a final browser state prior to closure of the connection with the website, wherein the final browser state includes a DOM tree.

37. The method of claim 19, further comprising providing an interactive interface for viewing the recorded set of browsing activities.

* * * * *

UNITED STATES PATENT AND TRADEMARK OFFICE
CERTIFICATE OF CORRECTION

| | | |
|---|---|---|
| PATENT NO. | : 11,979,383 B1 | Page 1 of 2 |
| APPLICATION NO. | : 17/306800 | |
| DATED | : May 7, 2024 | |
| INVENTOR(S) | : Lionel Litty, Todd Ignasiak and Rodrigo Graf | |

It is certified that error appears in the above-identified patent and that said Letters Patent is hereby corrected as shown below:

In the Drawings

In drawing sheet 13 of 45, figure 13, after "Enter", delete "users(s)" and insert --user(s)--, therefor.

In drawing sheet 13 of 45, figure 13, after "Enter", delete "groups(s)" and insert --group(s)--, therefor.

In drawing sheet 20 of 45, figure 20, after "Destination:", delete "dlpest.com" and insert --dlptest.com--, therefor.

In drawing sheet 33 of 45, figure 29A, delete "http://fileuploa2.com" and insert --http://fileupload.com--, therefor.

In drawing sheet 40 of 45, figure 30C, delete "Dowload All" and insert --Download All--, therefor.

In drawing sheet 42 of 45, figure 30E, delete "Dowload All" and insert --Download All--, therefor.

In the Specification

In Column 1, Line(s) 17, delete "by" and insert --be--, therefor.

In Column 7, Line(s) 44, after "point", delete "to".

In Column 11, Line(s) 30, delete "Unique id" and insert --Unique_id--, therefor.

In Column 11, Line(s) 30, delete "frame id" and insert --frame_id--, therefor.

In Column 16, Line(s) 50, delete "(page url)" and insert --(page_url)--, therefor.

In Column 22, Line(s) 33, delete "keypress'" and insert --'keypress'--, therefor.

Signed and Sealed this
Fifteenth Day of April, 2025

Coke Morgan Stewart
*Acting Director of the United States Patent and Trademark Office*

CERTIFICATE OF CORRECTION (continued)
U.S. Pat. No. 11,979,383 B1

In Column 30, Line(s) 28, delete ""tenant selected name"" and insert --"tenant_selected_name"--, therefor.

In Column 30, Line(s) 29, delete ""path within bucket"" and insert --"path_within_bucket"--, therefor.

In Column 30, Line(s) 32, delete "browsing recorder:" and insert --browsing_recorder--, therefor.

In Column 30, Line(s) 42, delete ""user input"" and insert --"user_input"--, therefor.

In Column 30, Line(s) 46, delete ""user input only"" and insert --"user_input_only"--, therefor.

In the Claims

In Column 33, Line(s) 32, Claim 1, delete "even" and insert --event--, therefor.

In Column 34, Line(s) 24, Claim 12, delete "browsing" and insert --browser--, therefor.

In Column 35, Line(s) 4, Claim 19, delete "determinining" and insert --determining--, therefor.

In Column 36, Line(s) 20, Claim 27, delete "claim 23" and insert --claim 24--, therefor.

In Column 36, Line(s) 34 & 35, Claim 31, delete "browsing" and insert --browser--, therefor.